Figure 1:
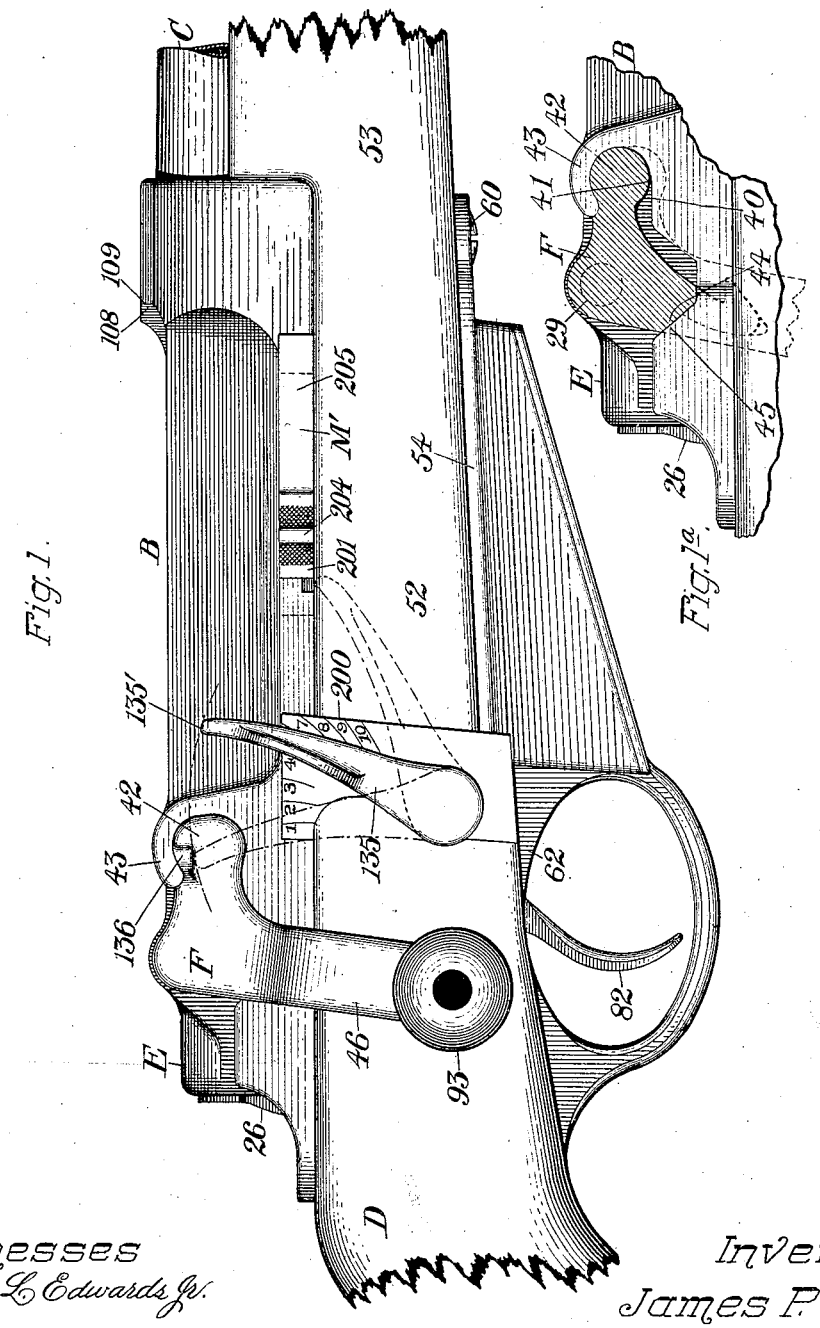

(No Model.)  
16 Sheets—Sheet 1.

J. P. LEE.
BOLT GUN.

No. 513,647.  
Patented Jan. 30, 1894.

Witnesses  
John L. Edwards Jr.  
Fred. J. Dole.

Inventor:  
James P. Lee  
By his Attorney  
F. H. Richards (No Model.)  16 Sheets—Sheet 5.

J. P. LEE.
BOLT GUN.

No. 513,647.  Patented Jan. 30, 1894.

Witnesses:
John L. Edwards Jr.
Fred. J. Dole.

Inventor:
James P. Lee.
By his Attorney,
F. H. Richards (No Model.) 16 Sheets—Sheet 6.
J. P. LEE.
BOLT GUN.

No. 513,647. Patented Jan. 30, 1894.

Witnesses:
John L. Edwards Jr.
Fred. J. Dole.

Inventor:
James P Lee,
By his Attorney,
F H Richards (No Model.)
J. P. LEE.
BOLT GUN.
No. 513,647.
16 Sheets—Sheet 7.
Patented Jan. 30, 1894.
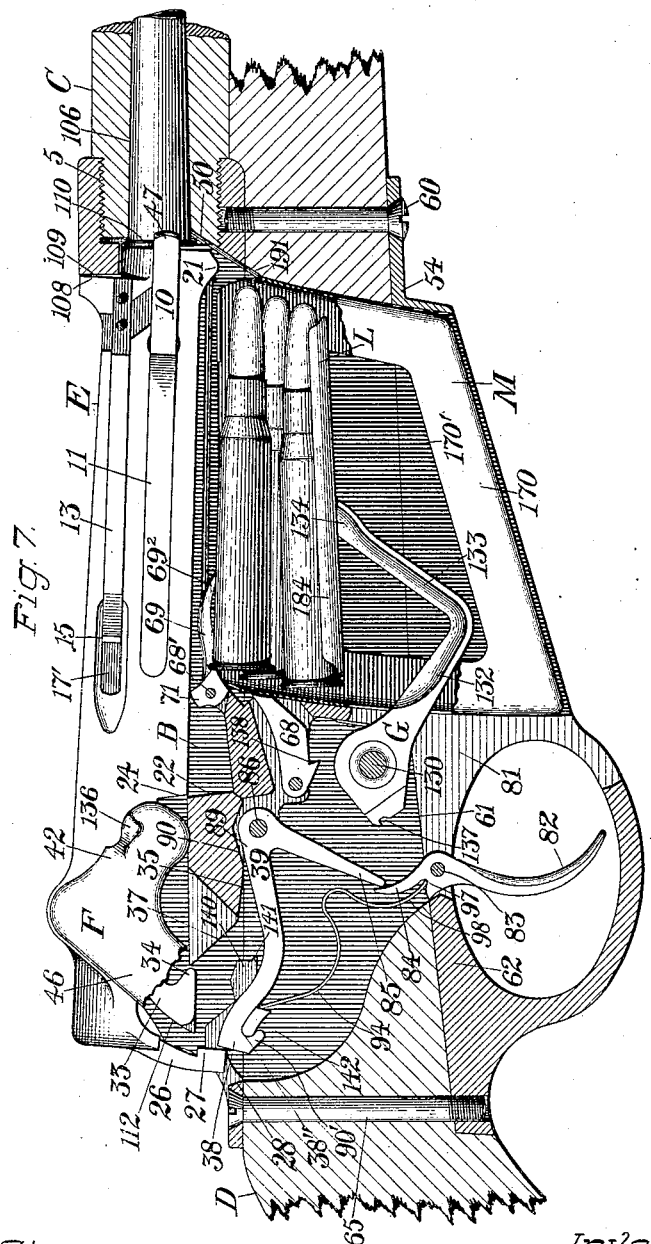
Witnesses:
John L. Edwards Jr.
Fred. J. Dole
Inventor:
James P. Lee,
By his Attorney,
F. H. Richards

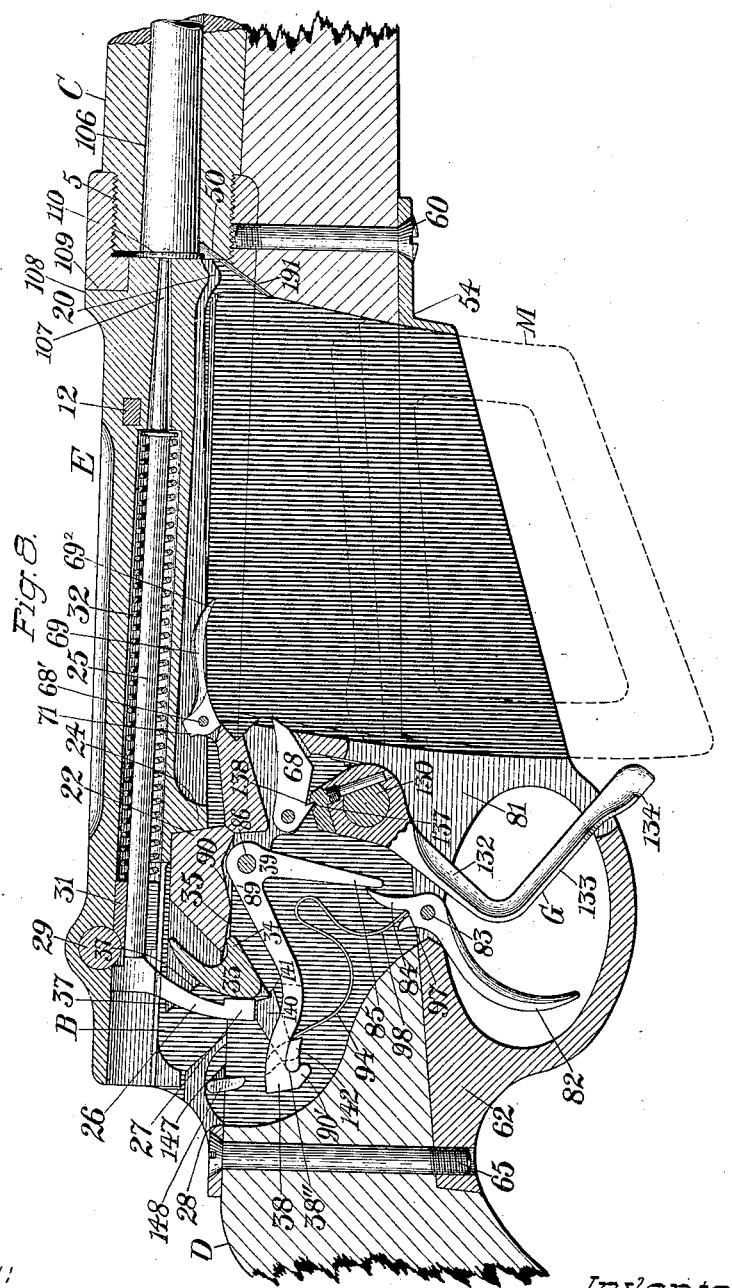

(No Model.)
J. P. LEE.
BOLT GUN.
No. 513,647.
16 Sheets—Sheet 9.
Patented Jan. 30, 1894.
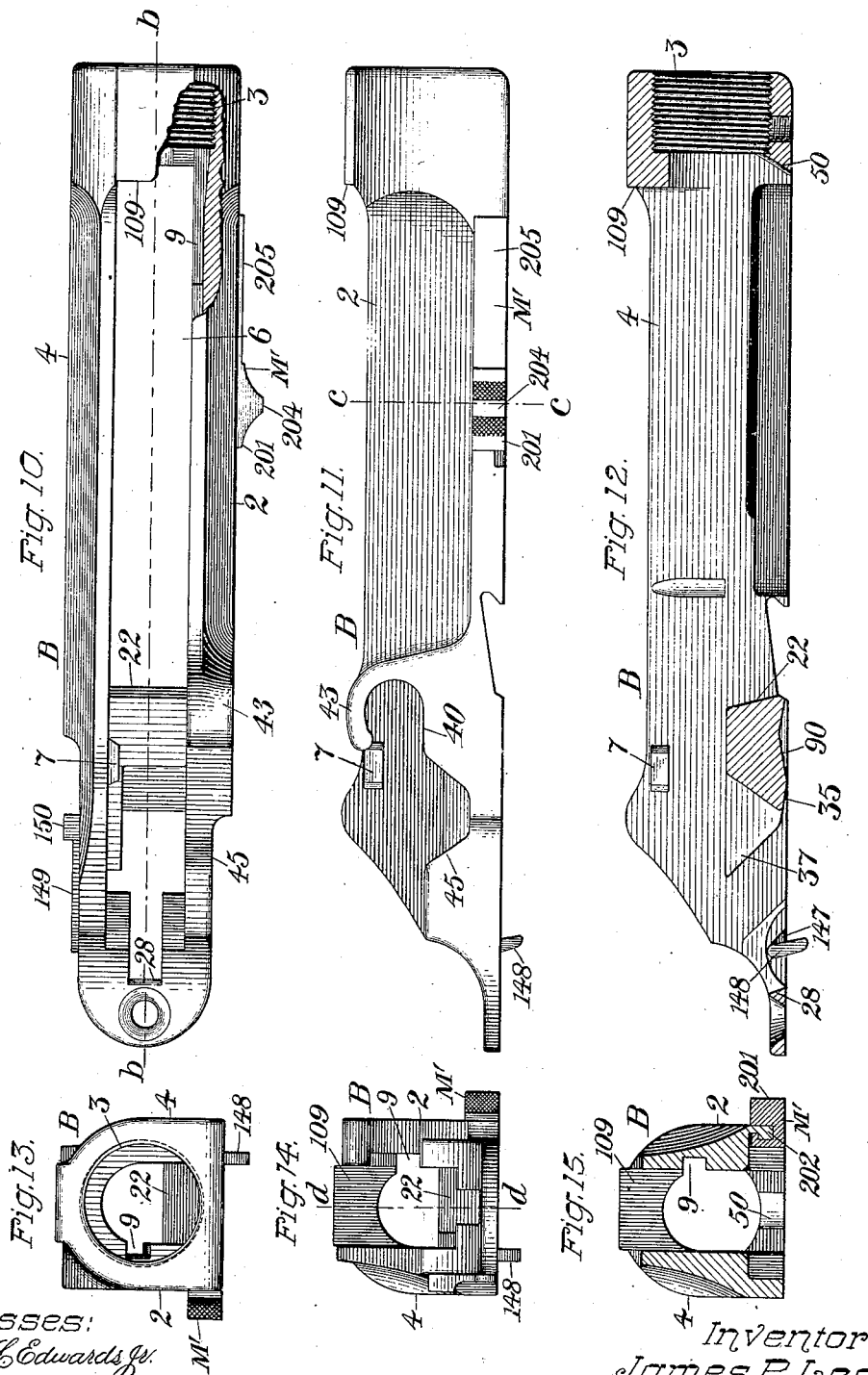
Witnesses:
John L. Edwards Jr.
Fred. J. Dole.
Inventor:
James P. Lee.
By his Attorney,
F. A. Richards

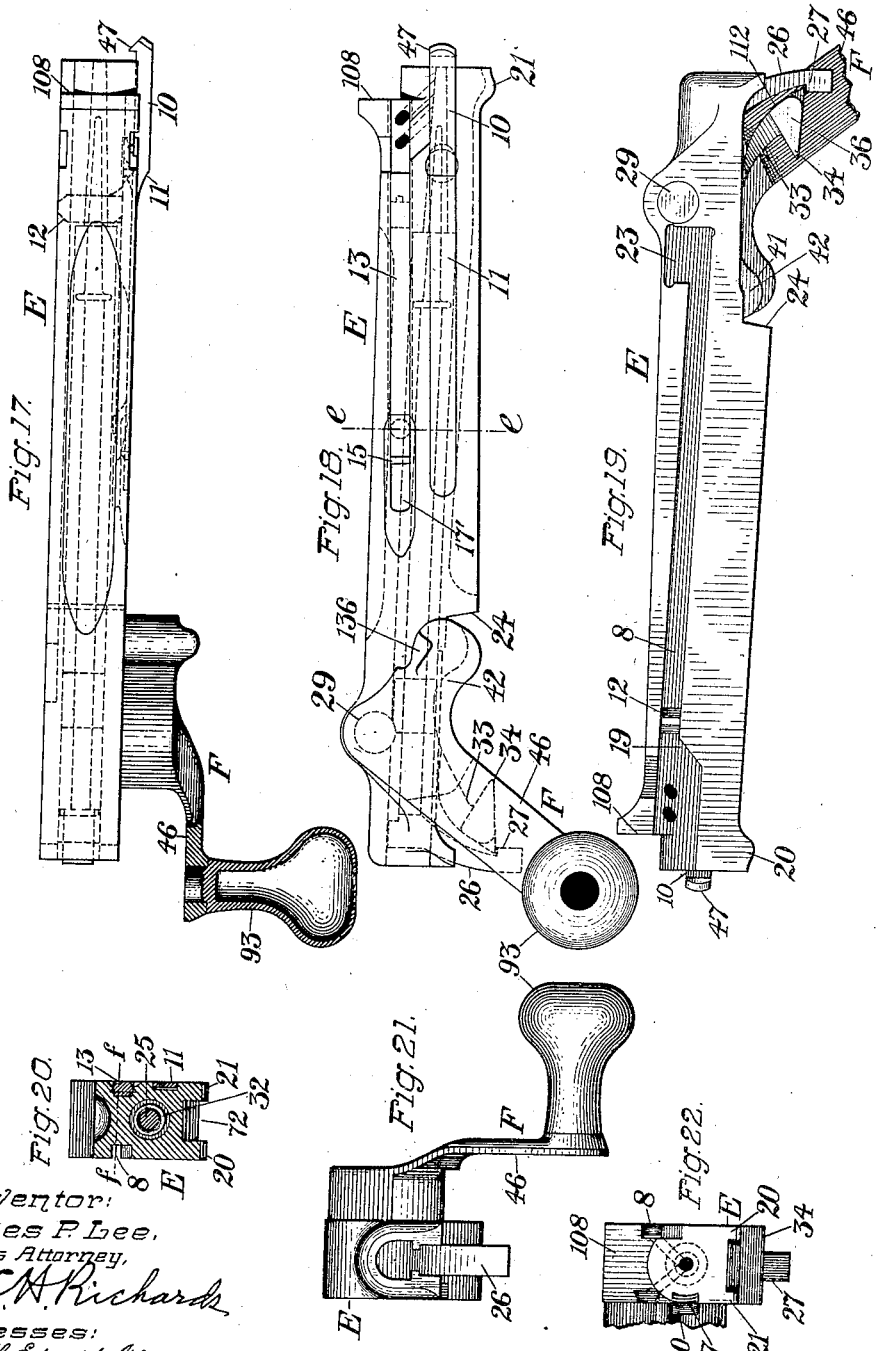

(No Model.)
J. P. LEE.
BOLT GUN.
No. 513,647.
16 Sheets—Sheet 11.
Patented Jan. 30, 1894.
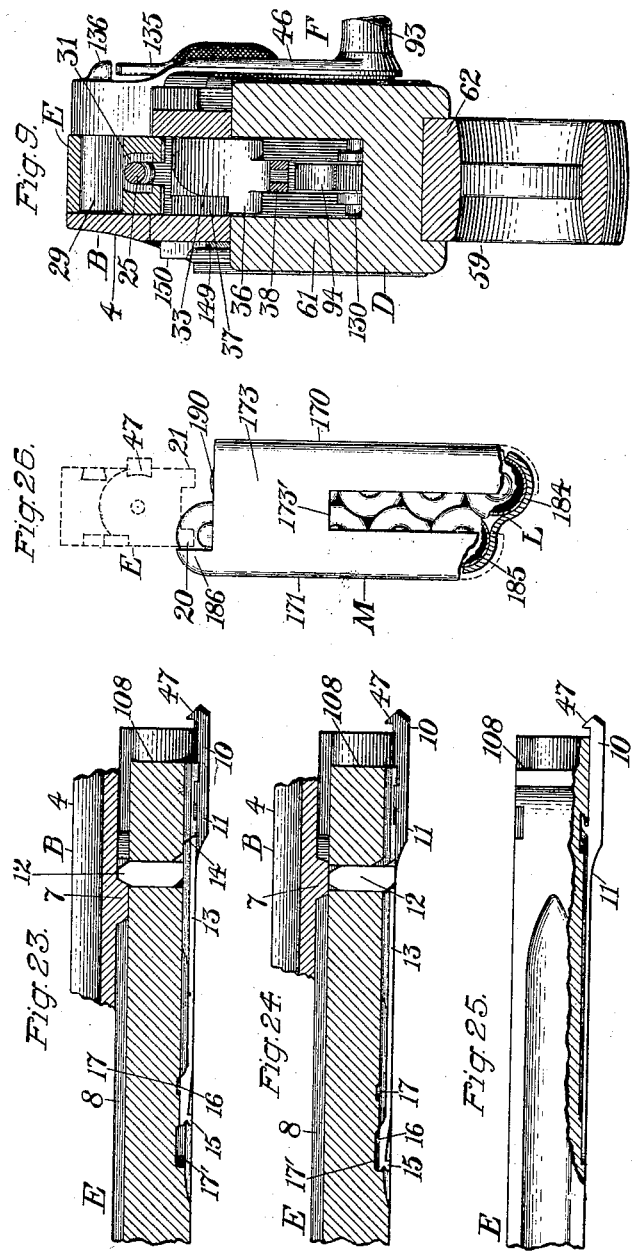
Witnesses:
John L. Edwards Jr.
Fred J. Dole.
Inventor:
James P. Lee.
By his Attorney,
F. A. Richards

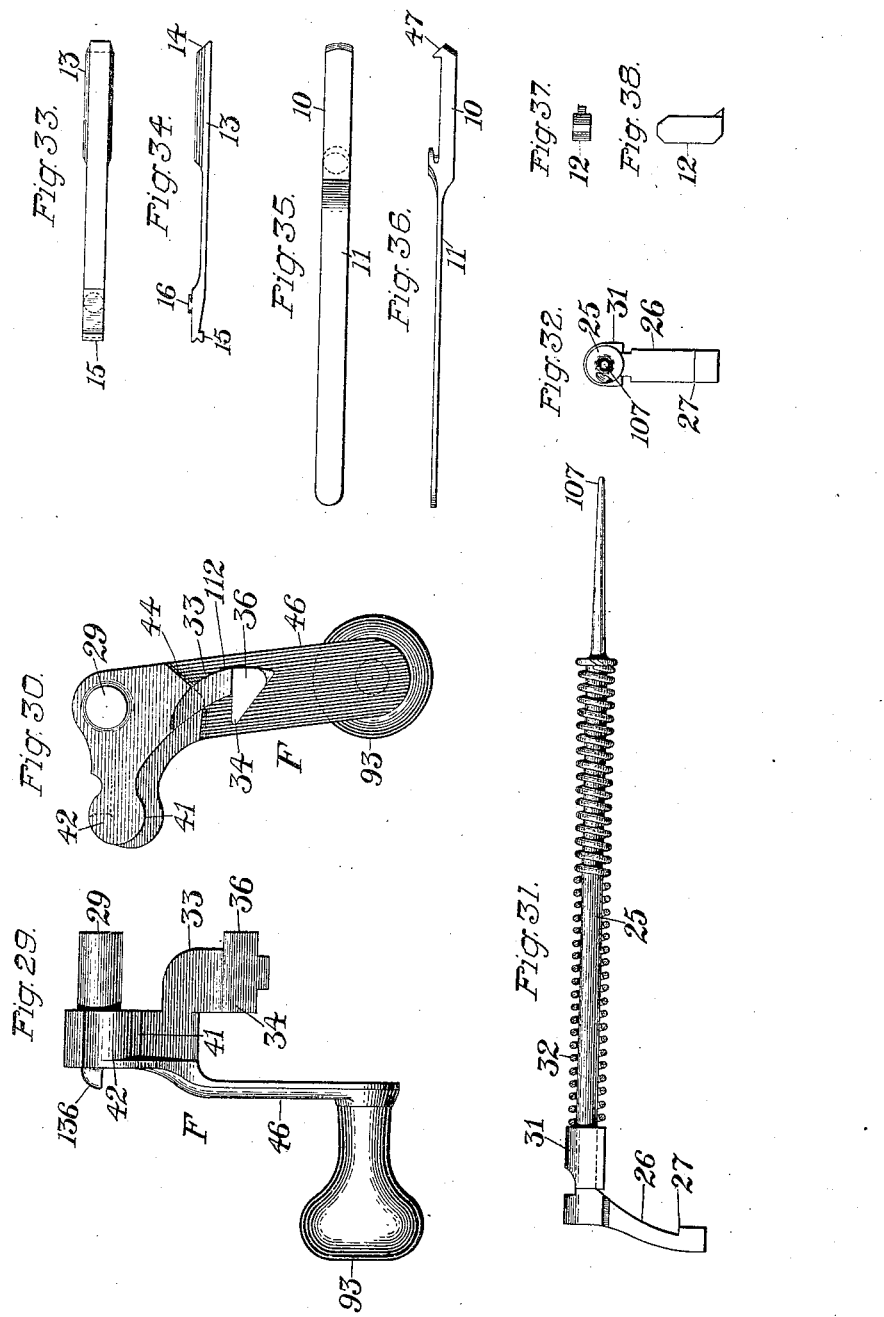

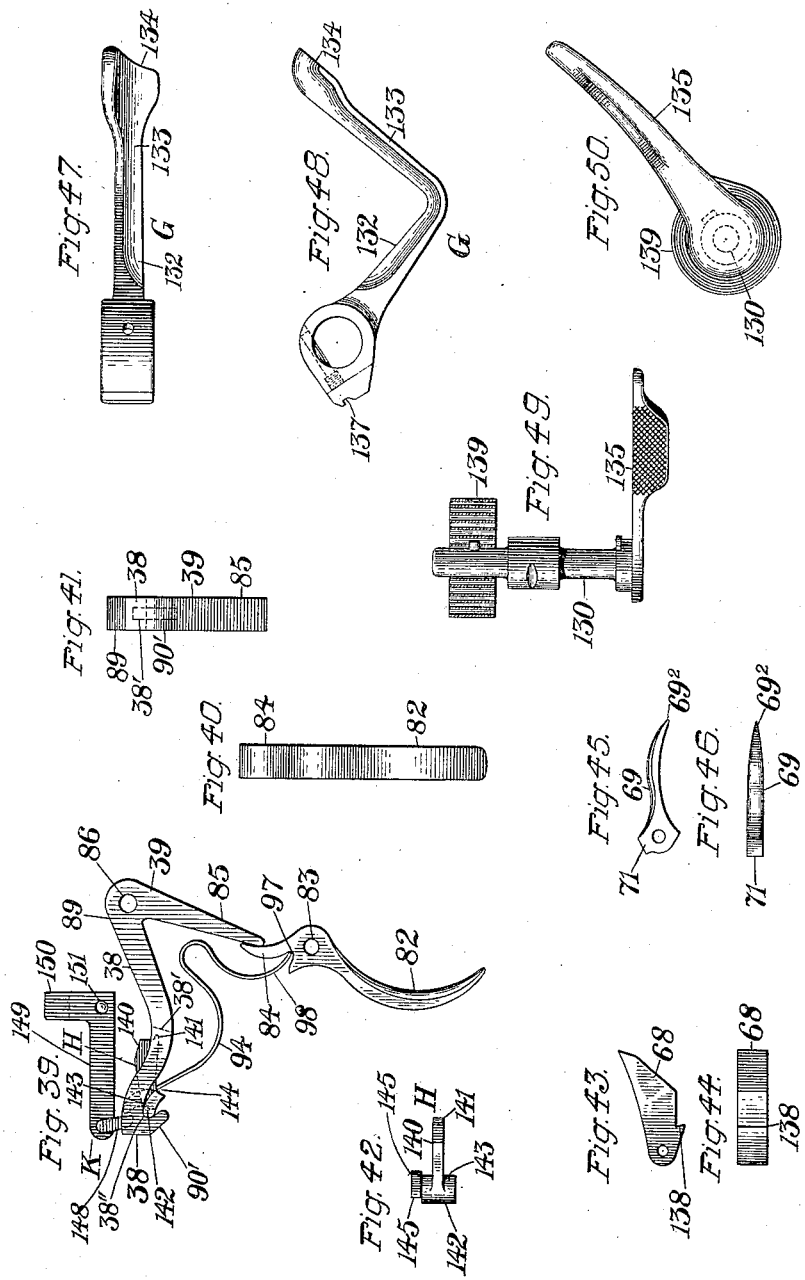

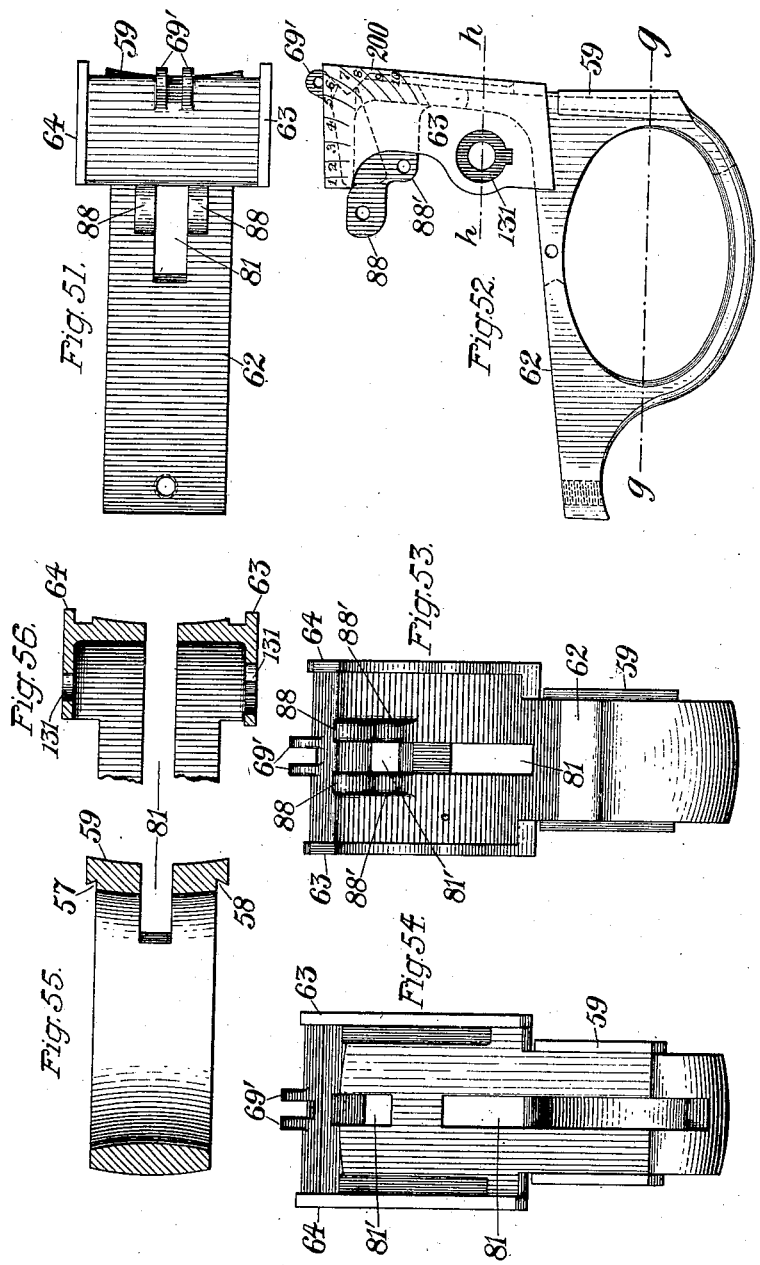

(No Model.)
J. P. LEE.
BOLT GUN.
No. 513,647.
16 Sheets—Sheet 15.
Patented Jan. 30, 1894.
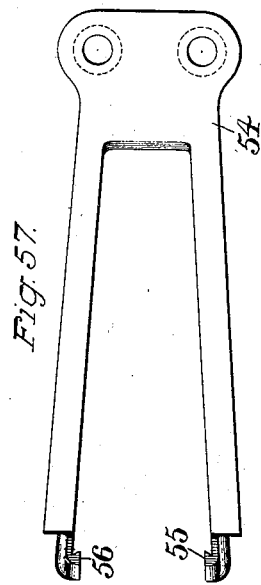
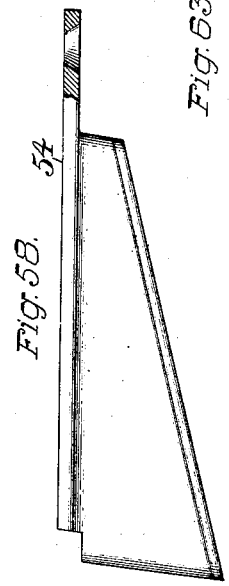
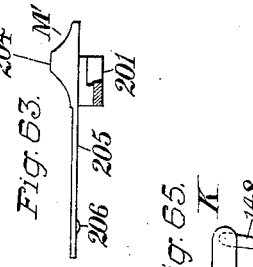
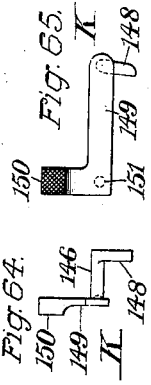
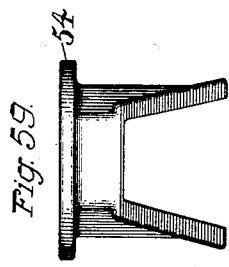
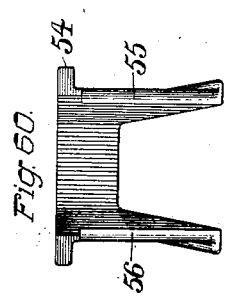
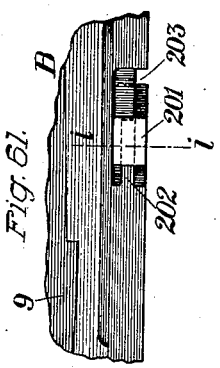
Witnesses:
John L. Edwards Jr.
Fred. J. Dole.
Inventor:
James P. Lee,
By his Attorney,
F. H. Richards

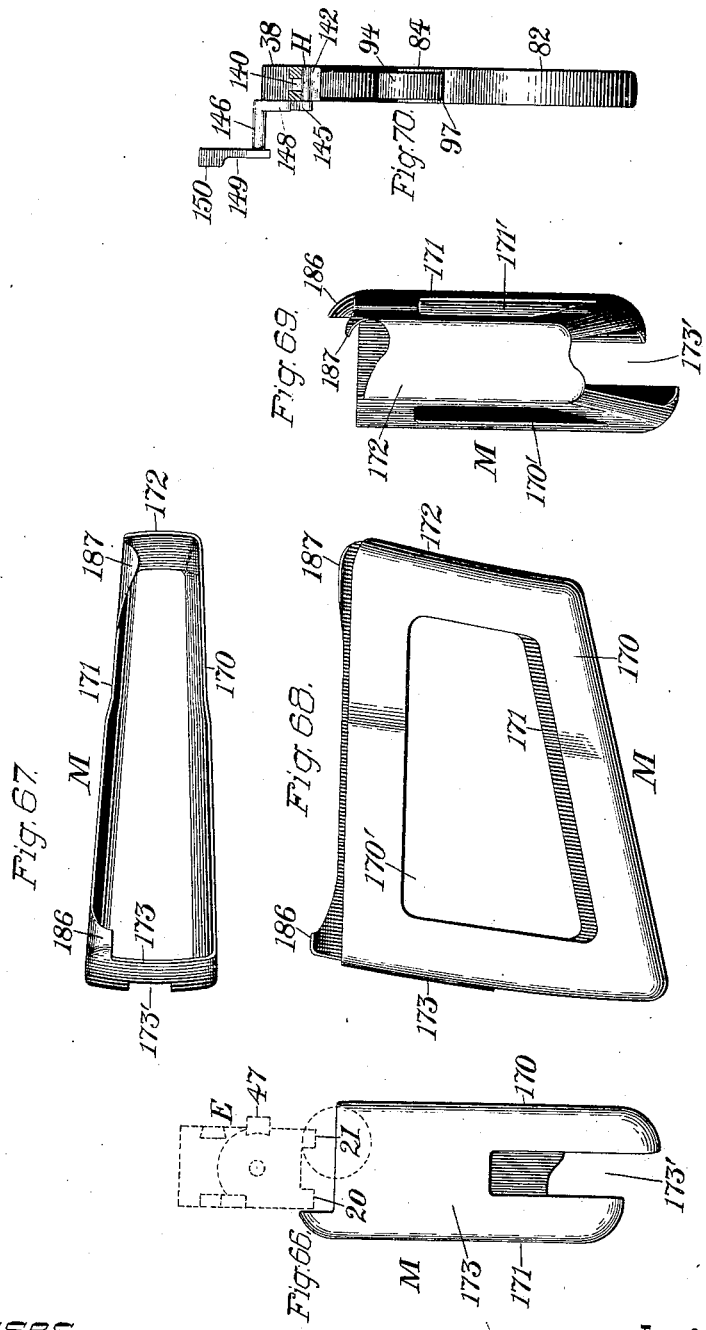

UNITED STATES PATENT OFFICE.

JAMES P. LEE, OF HARTFORD, CONNECTICUT.

BOLT-GUN.

SPECIFICATION forming part of Letters Patent No. 513,647, dated January 30, 1894.

Application filed July 26, 1893. Serial No. 481,539. (No model.)

*To all whom it may concern:*

Be it known that I, JAMES P. LEE, a citizen of the United States, residing at Hartford, in the county of Hartford and State of Connecticut, have invented certain new and useful Improvements in Bolt-Guns, of which the following is a specification.

This invention relates to that class of breech-loading guns generally known as "bolt-guns," and is in the nature of an improvement upon the bolt-gun shown and described in my prior application, Serial No. 443,431, filed August 19, 1892, to which reference may be had.

The object of the invention is to furnish a breech-loading gun having an improved mechanism whereby the sliding-bolt which forces the cartridge into the firing-chamber of the gun-barrel may be unlocked, actuated and locked with relation to its receiver, without imparting rotary movement thereto on its longitudinal axis; also to provide effective means for locking and unlocking the bolt, for withdrawing the cartridge-shell from the chamber of the gun-barrel and ejecting the same, for obviating the premature discharge of the cartridge by preventing a forward or firing-movement of the firing-pin until the bolt is completely thrown forward and locked in position, and for locking the bolt against retraction before this is entirely closed, whereby the gun will be rapid, effective and safe in action; also to provide means for "dead-locking" the bolt-actuator against accidental retraction after the same is in its forward locked position and retaining the same "locked" until the cartridge is discharged or the "dead-lock" released; also for automatically locking the bolt against retraction when the cartridge-magazine is emptied, and retaining the same in a locked condition until the emptied magazine is replenished or replaced by a filled one, and thereby, (on account of the locking of the bolt against retraction,) acquainting the gunner with the fact that the cartridge-magazine has been emptied; also to provide means whereby the gunner may unlock and retract the bolt after it has been "dead-locked" in a closed position preparatory to firing, to permit an undischarged cartridge to be withdrawn as is sometimes required.

Figure 2:
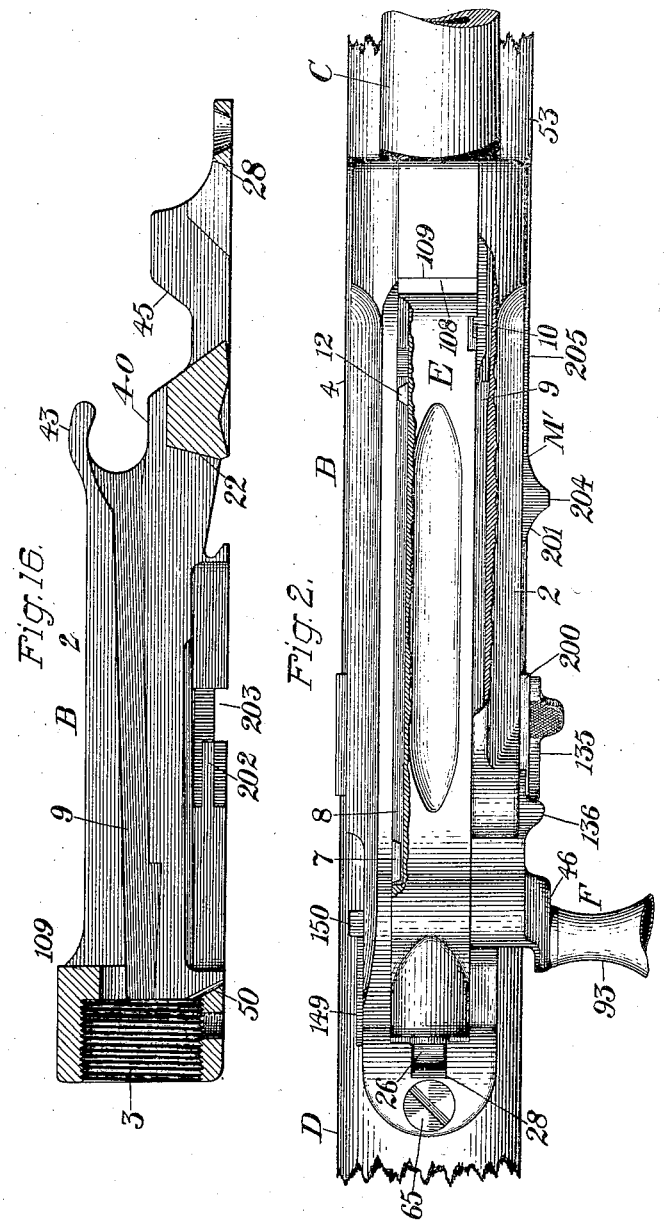
Figure 3:
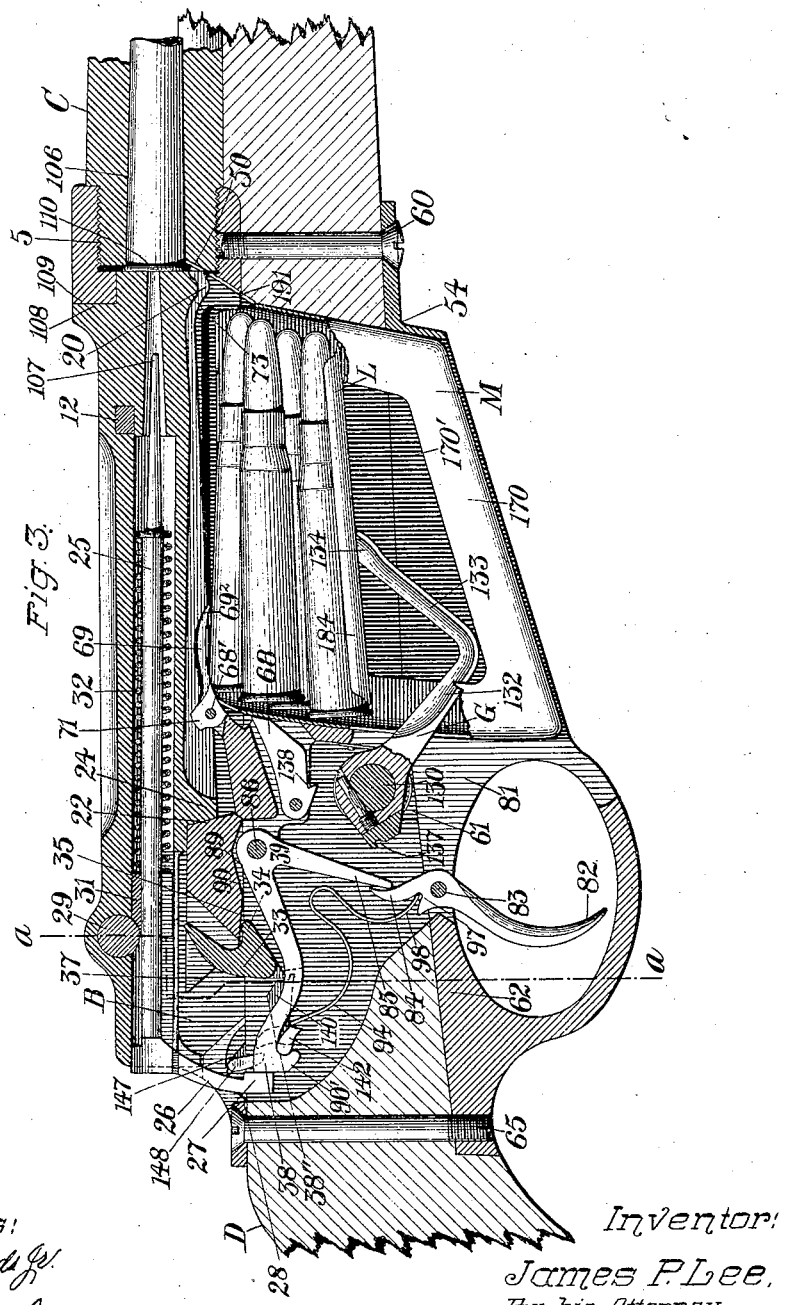
Figure 4:
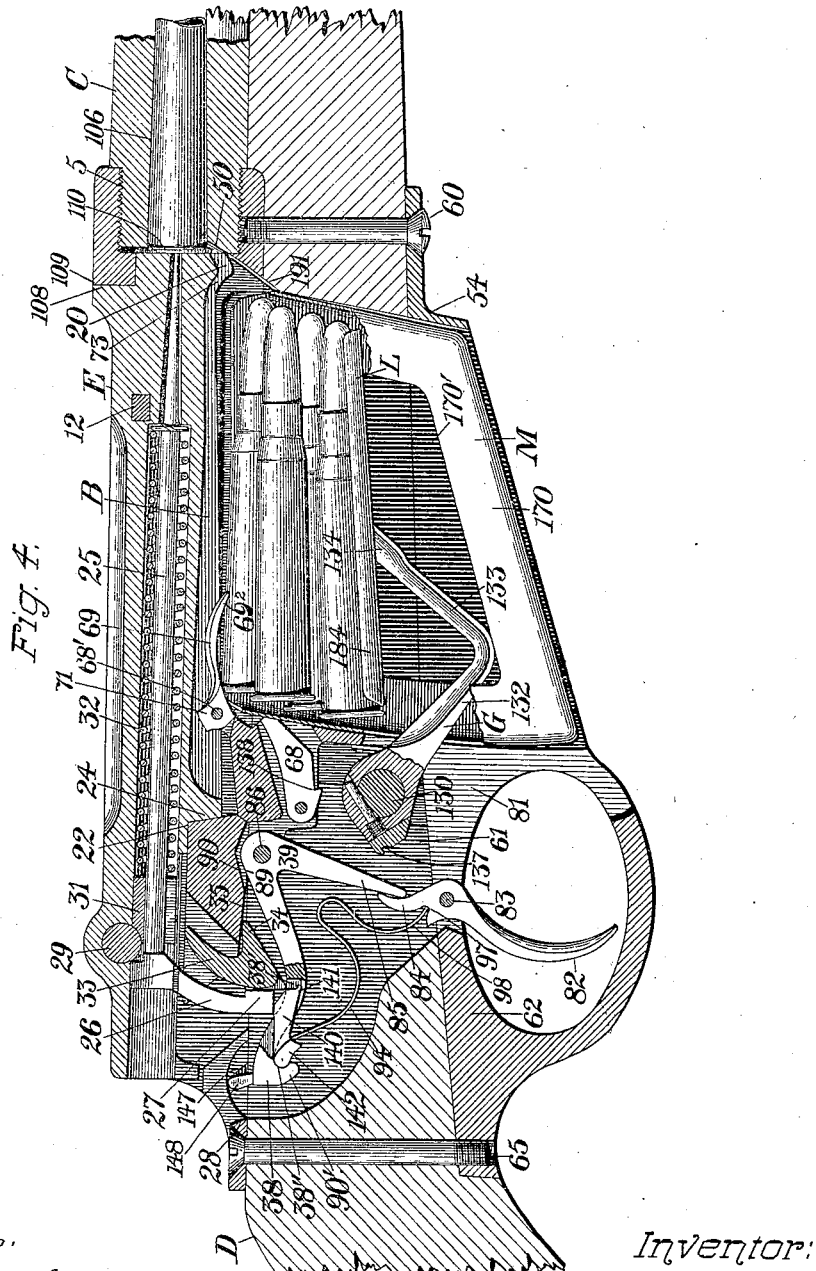
Figure 5:
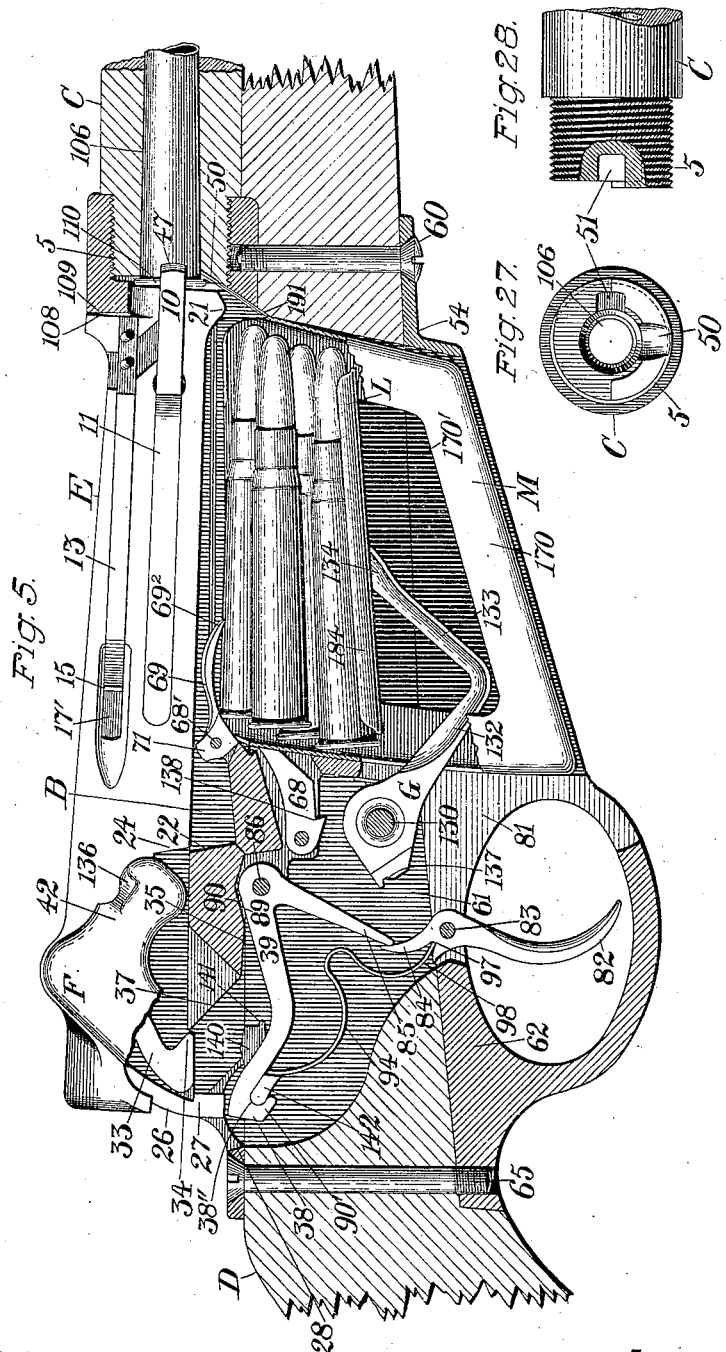
Figure 6:
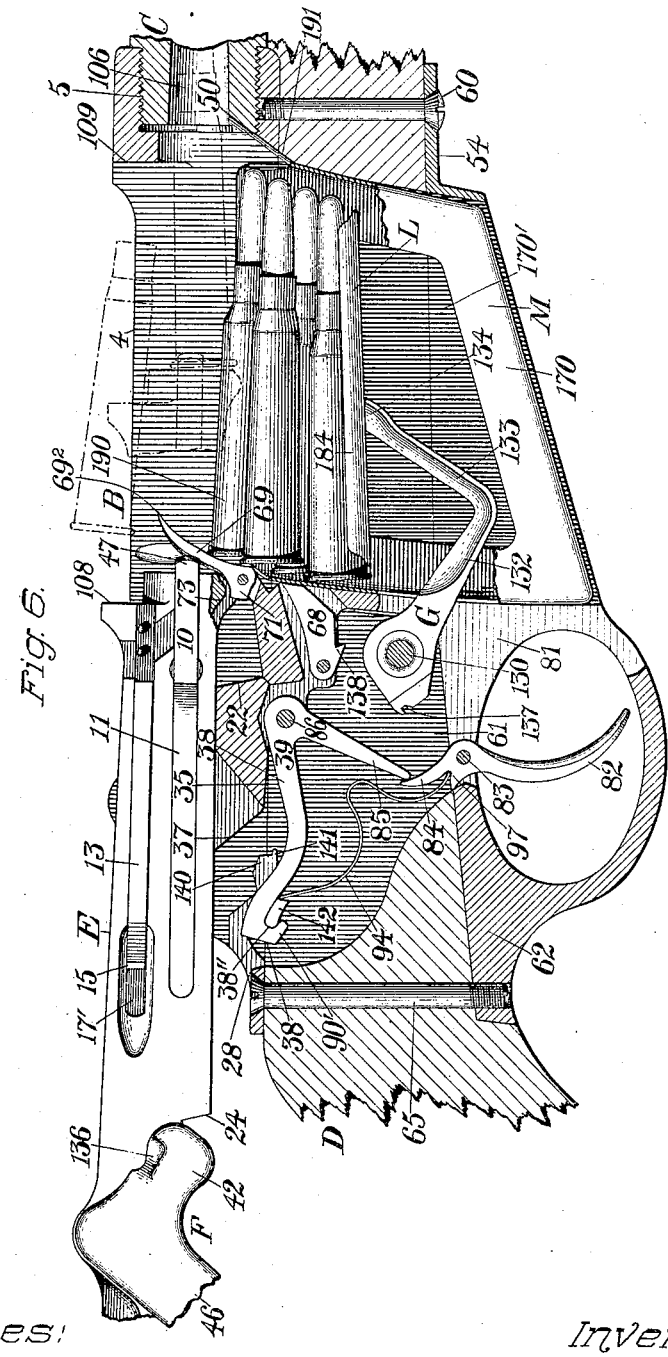

In the drawings accompanying and forming a part of this specification, Figure 1 Sheet 1 is a side elevation of a portion of a bolt-gun embodying my invention. Fig. 1ª Sheet 1 is a right-hand side elevation of a portion of the receiver and bolt, showing the bolt-actuator in vertical section, to clearly show the actuator and receiver abutments. Fig. 2 Sheet 2 is a plan view of the same, a portion being broken away to show the parts more clearly. Fig. 3 Sheet 3 is a vertical longitudinal section of the mechanism of the gun showing the parts in the position they assume when the gun is closed ready for firing. Fig. 4 Sheet 4 is a sectional view, similar to Fig. 3, showing the trigger as having been drawn back and the firing-pin thrown forward to discharge the cartridge. Fig. 5 Sheet 5 is a sectional view, similar to Figs. 3 and 4, showing the bolt-actuator thrown upward to the point of disengaging the bolt-abutment from the receiver-abutment and the parts in the position they occupy just prior to the retraction or withdrawal of the bolt. Fig. 6 Sheet 6 is a sectional view, similar to Figs. 3, 4 and 5, showing the bolt withdrawn its full stroke and also illustrating in dotted lines the ejection of the cartridge-shell. Fig. 7 Sheet 7 is a sectional view, similar to Figs. 3, 4, 5 and 6, showing the bolt returned to its forward position ready for the locking movement of the bolt-actuator and showing the said actuator disengaged from the catch of the firing-pin-arm. Fig. 8 Sheet 8 is a sectional view similar to Figs. 3, 4, 5, 6 and 7, showing the cartridge-lifter as locked in a depressed or inoperative position to permit the removal of the empty cartridge-magazine and the insertion of the fresh one. Fig. 9 Sheet 11 is a cross-sectional view in line $a$—$a$, Fig. 3, looking from the left-hand of said figure. Fig. 10 Sheet 9 is a plan view of the receiver, a portion of the upper forward end thereof being broken away. Fig. 11 Sheet 9 is a right-hand side elevation of the receiver. Fig. 12 Sheet 9 is a vertical longitudinal section of the same taken on dotted line $b$—$b$, Fig. 10. Fig. 13 Sheet 9 is an end view of said receiver looking from the right-hand of Fig. 10. Fig. 14 Sheet 9 is an end view of the receiver looking from the left-hand in Fig. 10. Fig. 15 Sheet 9 is a cross-section of the said receiver taken on dotted line $c$—$c$, Fig. 11.

Fig. 16 Sheet 2 is a vertical longitudinal section of the receiver taken on dotted line $d$—$d$, Fig. 14, looking from the left to the right of said figure. Fig. 17 Sheet 10 is a plan view of the bolt and bolt-actuator, a portion of the bolt-actuator being broken away. Fig. 18 Sheet 10 is a side elevation of the same. Fig. 19 Sheet 10 is a side elevation of the said bolt and bolt-actuator looking toward the right-hand in Fig. 21, a portion of the bolt-actuator being broken away. Fig. 20 Sheet 10 is a cross-sectional view of the same taken on dotted line $e$—$e$, of Fig. 18, looking in the direction of the arrow. Fig. 21 Sheet 10 is an end view of the same looking toward the right-hand in Fig. 18. Fig. 22 Sheet 10 is an end view of the said bolt, looking toward the right-hand in Fig. 19, the bolt-actuator being broken off. Fig. 23 Sheet 11 is a horizontal longitudinal section of a portion of the bolt taken on dotted line $f$—$f$, Fig. 20, showing the detent-pin and detent-pin-actuator-slide for preventing the retraction of the bolt beyond its normal rearward working position, said detent-pin being shown in said figure as thrown toward the left-hand in operative position. Fig. 24 Sheet 11 is a similar sectional view showing the detent-pin as thrown to the right-hand side of said bolt and in the position it occupies when it is desired to withdraw the bolt from the receiver. Fig. 25 Sheet 11 is a plan view, partially in section, of the bolt showing the arrangement of the cartridge-extractor. Fig. 26 is an end view of the cartridge-magazine, the bolt being shown in its relative position thereto in dotted lines. Fig. 27 Sheet 5 is a detail view of the cartridge-receiving end of the gun-barrel showing the cartridge-guiding-groove and the notch for receiving the end of the extractor. Fig. 28 Sheet 5 is a side elevation of a portion of the cartridge-receiving end of the gun-barrel. Fig. 29 Sheet 12 is a detail in front-end elevation of the bolt-actuator. Fig. 30 Sheet 12 is a side elevation of the same looking toward the left-hand in Fig. 29. Fig. 31 Sheet 12 is a side elevation of the firing-pin, a portion of the firing-spring being shown in section. Fig. 32 Sheet 12 is an end view of the said firing-pin looking toward the left-hand in Fig. 31. Fig. 33 Sheet 12 is a side elevation, and Fig. 34 Sheet 12 is an edge view of the detent-pin actuator-slide. Fig. 35 Sheet 12 is a side elevation, and Fig. 36 Sheet 12 is a plan view of the extractor. Fig. 37 Sheet 12 is an end view, and Fig. 38 Sheet 12 is a plan view of the detent-pin. Fig. 39 Sheet 13 is a detail in side elevation of the sear, sear-spring, trigger, back-lock for locking the bolt-actuator in its closed position, and the back-lock-actuator, in assembled position. Fig. 40 Sheet 13 is a rear end elevation of the trigger looking from the left-hand of Fig. 39. Fig. 41 Sheet 13 is a rear view of the sear. Fig. 42 Sheet 13 is a top view of the back-lock for the bolt-actuator. Fig. 43 Sheet 13 is a detail in side elevation, and Fig. 44 Sheet 13 an under side view of the cartridge-lifter-locker. Fig. 45 Sheet 13 is a side view, and Fig. 46 Sheet 13 is a plan view of the cartridge-shell ejector. Fig. 47 Sheet 13 is a plan view and Fig. 48 Sheet 13 is a side elevation of the cartridge-lifter. Fig. 49 Sheet 13 is a plan view, and Fig. 50 Sheet 13 is a right-hand side elevation of the cartridge-lifter shaft, its actuating spring and lever. Fig. 51 Sheet 14 is a plan view, and Fig. 52 Sheet 14 is a side elevation, of the guard-block. Fig. 53 Sheet 14 is an end view of the said guard-block looking toward the right-hand in Fig. 52. Fig. 54 Sheet 14 is a view similar to Fig. 53 looking toward the left-hand in Fig. 52. Fig. 55 Sheet 14 is a horizontal cross-section of said guard-block taken on dotted line $g$—$g$, Fig. 52, looking downward. Fig. 56 Sheet 14 is a similar sectional view of said guard-block taken on dotted line $h$—$h$, Fig. 52. Fig. 57 Sheet 15 is a plan view, and Fig. 58 Sheet 15 is a side elevation, partially in section, of the magazine-guard or escutcheon-plate. Fig. 59 Sheet 15 is an end view of the magazine-guard or escutcheon-plate looking toward the left-hand of Fig. 58. Fig. 60 Sheet 15 is a similar end view looking toward the right-hand of Fig. 58. Fig. 61 is a detail of a portion of the inner side of the right-hand wall of the receiver, as shown in Fig. 16, showing the arrangement of the cut-off or sliding stop which is thrown into engagement with the actuating lever of the cartridge-lifter when it is desired to hold the same in an inoperative position and to use the gun as a single breech-loader. Fig. 62 Sheet 15 is a cross-sectional detail of the sliding cut-off taken on dotted line $i$—$i$, Fig. 61. Fig. 63 Sheet 15 is a detail in plan view of said cut-off. Fig. 64 Sheet 15 is an end view, and Fig. 65 Sheet 15 is a side view of the back-lock-actuator. Fig. 66 Sheet 16 is an end view of the cartridge-case or packet as looking toward the right-hand of Fig. 68. Fig. 67 Sheet 16 is a plan view of said cartridge-case. Fig. 68 Sheet 16 is a side elevation of the cartridge-case, looking toward the left-hand in Fig. 66. Fig. 69 Sheet 16 is an end view of the same looking toward the left-hand in Fig. 68. Fig. 70 Sheet 16 is an end elevation of the sear, sear-spring, back-lock, and back-lock-actuator, as looking toward the right-hand in Fig. 39, a portion of the sear being in section.

Similar characters designate like parts in all the figures.

The receiver, designated in a general way by B, is adapted to carry a sliding bolt and has a recoil-abutment for sustaining the bolt, when this is closed, against retraction. In the preferred form herein shown, the receiver or gun-frame consists of an open frame having the two side-walls 2 and 4, joined at their front and rear ends and constructed to carry the barrel, C, and for attachment to the stock, D, of the gun and to receive within it the bolt-mechanism. At its front end, the receiver has the bore, 3, see Fig. 12, for receiving the threaded end 5, of the barrel C. A mortise, 6, Fig. 10, is formed vertically and longitudinally through the receiver, as shown in Fig. 10, for receiving the upper end of the cartridge-magazine M (Figs. 3, 4, 5, 6 and 7) through which mortise the magazine may be filled, or the gun may be loaded in using the same as a single-loader; the gun being capable of being used as a single-loader at any time the magazine is emptied of cartridges. When it is desired to prevent the feeding of the cartridges from the magazine into position to be forced into the firing-chamber, the cut-off, designated in a general way by M', will be thrown into operative engagement with the cartridge-lifter-actuating-lever to hold the same in an inoperative position, as will be hereinafter more fully described.

(Note.—For convenience of comparison between the specification and drawings, and to secure a clear understanding of the description, it is desired to here state that by the terms such as "right-hand" and "left-hand," are meant those portions of the gun to the right and left, respectively, when viewed from the left-hand side of the drawings as shown in Fig. 1, and by "forward" and "rearward," are meant those portions of the gun nearest the right and left-hand ends of the gun, respectively, as shown in said Fig. 1 of the drawings.)

Upon the inner side of the left-hand wall 4 of the receiver is formed a projection, or abutment, 7, which fits into a groove, 8, in the left-hand side of the bolt E, for guiding this in its course during the rearward and forward movements thereof. Said projection also acts as a detent-catch for limiting the relative sliding movement of the bolt by engagement with a corresponding detent-pin, 12, carried by, and capable of transverse movement in, the bolt.

Upon the inner side of the right-hand wall 2 of the receiver B, is formed a groove, 9, see Figs. 13, 14, 15, and 16, in which runs the projecting forward part, 10, of the extractor, 11, which projecting portion of the extractor also acts in conjunction with the receiver projection 7 as a guide for the bolt.

For preventing, during the ordinary operation of the gun, the retraction of the bolt beyond its normal rearward working position, shown in Fig. 6, the said bolt is provided with a transverse detent-pin, 12, best shown in Figs. 23 and 24. This pin 12 is fitted to slide freely in the transverse horizontal opening or recess formed through the bolt E, and is thrown outward toward the left-hand as shown in Fig. 23, by means of a detent-pin-actuator-slide, 13, which is shown as let-in on the right-hand side of the bolt, and is shown as beveled on the inner side of its forward end, as at 14, see Fig. 24, to abut against and throw said detent-pin from the position shown in Fig. 24 to that shown in Fig. 23, on the forward movement of the slide 13, which slide has formed thereof in a spring-catch, 15, whereby to operate the same by the finger of the gunner. The rearward portion of said detent-pin-actuating-slide is of the nature of a spring and has on the inner side thereof a catch or projection, 16. Formed in the right hand side of the bolt, and in position to be engaged by the catch or projection, 16, upon the slide 13 in its forward and rearward position, respectively, are two notches, 17, 17', the one being capable of receiving the catch 16 upon the actuating slide, when said slide is in its forward position as shown in Fig. 23, and the one 17' receiving said catch when the slide is in its rearward position, as shown in Fig. 24, said catches limiting the movement of said slide and also preventing accidental longitudinal displacement when the same is in either of the positions just described. The front and rear sides of the left-hand end of the detent-pin are formed inclined, as shown in Fig. 23, and the sides of the aforesaid receiver projection 7 are correspondingly inclined, so that when said detent-pin-actuating-slide is withdrawn, as shown in Fig. 24, for the purpose of fully withdrawing the bolt from its receiver, said projection 7, striking with its inclined face against the inclined face of the detent-pin, will drive said pin toward the right-hand side of the bolt, thus allowing the pin to clear the projection and permitting the bolt to be entirely withdrawn from the receiver. When inserting the bolt, assuming the pin to be in the position shown in Fig 24, it will be slipped into the receiver far enough to carry the detent-pin forward of the projection 7. Said pin should then be thrown toward the left-hand into its working position. This may be done by simply pushing forward the slide 13 from its position in Fig. 24 to that in Fig. 23.

The groove 8 formed in the left-hand side of the bolt turns downwardly at the point 19, near the forward end of the bolt, and then runs forwardly parallel with the bolt, for the purpose of permitting the forward end of the bolt to rise just before it is withdrawn from the receiver to allow the projections 20, 21, at the lower side of the bolt to pass over the receiver-abutment, 22; this feature is, of course, operative only when the bolt is to be fully withdrawn from the receiver. At its rearward end the said bolt-groove 8 is broadened to form the vertically extending notch 23 for permitting the lowering of the bolt when it is in its extreme forward position to bring the bolt-abutment 24 forward of the aforesaid receiver-abutment 22.

The bolt E is bored longitudinally thereof to receive the firing-pin, 25, and at the rearward end thereof is downwardly slotted for the depending-arm, 26, of said firing-pin, which firing-pin-arm projects downward from the rear end of the firing-pin, as shown in detail, Fig. 31, and has on the forward side of its lower end, a catch, 27, for the purpose hereinafter more fully set forth. On the lowering of the bolt (by a movement transversely of the axis thereof) into engagement with the receiver-abutment and to the firing position of the gun shown in Fig. 3, the arm 26 of the firing-pin extends below the safety-abutment, 28, of the receiver (also designated the bolt-locker-engaging-abutment) so as to prevent the blowing out of the rearward part of the firing-pin, should said pin by any means become broken in action, such accident sometimes happening by perforation of a cap on a cartridge.

Near its rearward end, immediately above and partially intersecting the bore of the firing-pin, the bolt is transversely bored to receive a journal, 29, of the bolt-actuator, (which is designated in a general way by F,) which journal stands, when the parts are assembled, close to the upper side of the rod 25 of the firing-pin, said actuator-journal forming the abutment for the supporting-sleeve, 31, of the firing-spring, 32.

The bolt-actuator F, which is also designated as the bolt-locker, is shiftable from one position to another relative to the bolt, and has several functions; among the principal of these is the lifting and lowering of the rearward end of the bolt when this is to be moved back and after the same has been moved forward, and to furnish an additional lock of the bolt against rearward movement before this is fully lowered into its closed position ready for firing. Another function of the actuator F, besides holding the bolt E down in its closed position, is to prevent the forward movement of the firing-pin until after the bolt has been carried down into a safe locked position. For these purposes, the actuator or bolt-locker F is furnished with a depending-arm 33, having on the forward side thereof a hook, 34, which, on the closing of said actuator, as shown in Figs. 1, 3 and 4, engages under the lock-engaging-catch, 35, of the receiver directly underneath the journal 29, of the bolt-actuator. The extreme point of the hook 34, is shown beveled off or slightly relieved to form a cam for powerfully drawing down the bolt transversely thereof into its full closed position during the latter part of the closing movement of the bolt-actuator. At the left-hand of the lower end of said actuator-arm 33, is a projection, 36, the forward part of which coincides with the end of the aforesaid hook 34, and which passes close underneath the inclined cam-face, 37, of the receiver during the entire closing movement of the bolt-actuator. Said projection 36 serves to forcibly draw down the actuator and bolt to their closed position on the turning of the actuator from its position in Fig. 7, to its position in Figs. 1 and 3.

The rearward side, 112, of the depending actuator-arm 33 serves, on the retracting movement of the bolt-actuator, to draw back the firing-pin from the position shown in Fig. 4, to that shown in Fig. 5; on the extreme retraction of the actuator, as shown in Fig. 5, said arm passes over and engages upon the actuator-locker-catch 27 so as to lock the actuator in its retracted position, as shown in the figure referred to. Said several parts being thus positioned and locked together, may then be drawn back as one member of the gun-mechanism to the position illustrated in Fig. 6, and afterward pushed forward to the position shown in Fig. 7, at which time the firing-pin-arm 26 engages the rearward end, 38, of the sear, 39, releasing the actuator-arm and being thus held in a retracted position during the remaining forward and downward movement of the bolt-mechanism to the position thereof shown in Fig. 3. The bolt-actuator arm being thus carried forward of, and released from engagement with the catch of the firing-pin, may now be turned downward and forward bringing the parts from the position shown in Fig. 7 to the locked firing-position shown in Fig. 3.

Just previous to the firing-pin-arm 26 coming into engagement as hereinbefore described, with the rearward end 38 of the sear 39, the guide-face, 41, of the actuator comes over the lower actuator-guide, 40, of the receiver, and the upper side of the lever-arm, 42, of the actuator passes under the receiver-arm or upper actuator-guide, 43, thereby restraining the actuator from any forward shifting movement until the actuator shall have been unlocked by the releasing of its arm 33 from engagement with the firing-pin-arm-catch 27, and the bolt shall have reached its extreme forward position, as shown in Fig. 7. On the bolt reaching the latter position, the abutment-face 44, of the actuator passes forward of the actuator-abutment 45, of the receiver, see Figs. 1ᵃ, 30 and 50, so that on the turning forward of the actuator by a downward and forward thrust of the handle-arm 46, thereof, by means of the aforementioned cam 37, (and also during a portion of the closing movement through the forwardly projecting actuator-arm 42) draws down the bolt from its position shown in Fig. 7 to its fully closed position in Figs. 1 and 3. At this time the bolt of the gun, as will be observed, is locked in place, not only by its own recoil-abutments, but also by the engagement of the actuator with the bolt and with the receiver, thus furnishing a double security against any retraction of the bolt by accident or otherwise until the actuator shall again be opened.

The forward end of the bolt E has on its upper side a face, 108, bearing against a corresponding face, 109, of the receiver. On the lifting or transverse movement of the rearward end of the bolt, said face 108, acts against the receiver-face, 109, as a fulcrum upon which the bolt, as a lever, turns or swings for forcibly starting and withdrawing the cartridge for a short distance by means of the extractor-hook, 47, engaging the rim, 110, of the cartridge. See Fig. 5. The bolt, therefore, constitutes, not only a sliding bolt for the closing of the gun, and for pushing forward the cartridges into the firing-chamber thereof, but also a power lever for starting the cartridge-shell from its seat within the gun-chamber. Said cartridge-starting function of the bolt being effected by the same movement which lifts the recoil-abutment 24 clear of the receiver-abutment 22, it is evident that the same operation of the bolt thus performs the two more important functions of the mechanism by a single means and adds to the simplicity and efficiency and the corresponding value of the mechanism.

The projections 20, 21, at the forward end and lower part of the bolt, serve to alternately engage the uppermost cartridge of the columns of cartridges contained in the cartridge-case to force it forward into the gun-barrel, as will be hereinafter more fully described. At the rear end of the barrel, in vertical alignment with its bore, and in alignment with the path of movement of the cartridge, is a cartridge-guiding-groove or recess 50, suitably inclined for receiving the forward end of the cartridge when this is driven forward by the bolt, and thereby guiding said cartridge upward into the firing-chamber of the gun-barrel. At the right-hand inner side of the barrel, at its rear end, is formed a suitable notch, 51, for receiving the projecting forward end or hook, 47, of the extractor.

In Figs. 1 and 2 of the drawings, a short portion of the rearward part, 52, of the tip, 53, of the gun-stock is shown. On the end of this tip is usually placed an escutcheon-plate 54, which forms a guard for, and guides the magazine in its insertion in the receiver. At the rear end of the escutcheon-plate 54, are inward projections preferably dovetailed as shown at 55 and 56, in Fig. 57, which fit into similar notches, 57 and 58, respectively, in the forward side-face of the guard-block, 59, near the forward end thereof. Through the forward end of said escutcheon-plate passes a screw, 60, which extends through said tip 53, and screws into the forward end of the receiver as shown in Fig. 3.

The breech-piece, 61, of the stock is fitted to the under side of the receiver between the receiver and the strap, 62, of the guard-block; the forward end of the breech-piece being fitted between the side-walls 63 and 64 of said block. The screw, 65, passes through the rearward end of the receiver, through the stock, and screws into the rearward end of said strap 62, as will be understood by comparison of the figures of the drawings in which said parts are shown.

The guard-block 59 is mortised as at 81, 81', at the forward end thereof to receive, respectively, the cartridge-feeding device which is herein designated as the cartridge-lifter, G, and the cartridge-lifter-locker, 68. The cartridge-lifter is removably secured at its rear end to a transverse shaft, 130, journaled in bearings, 131, in the side walls 63, 64, of the guard-block in the rear of the front face thereof, and the cartridge-lifter-locker is pivoted between ears, 88', formed upon the guard-block above and approximately in vertical alignment with the pivotal point of the cartridge-lifter. The construction, arrangement and operation of these elements will be hereinafter fully explained.

The mortise 81 of the guard-block extends backward into the strap 62 thereof to receive the trigger, 82, which is pivoted near its upper end at 83, between the walls of the strap 62. The upper end, 84, of said trigger is connected with the arm, 85, of the sear 39, which is pivoted at 86, between ears, as 88, formed upon the guard-block 59, above and slightly in advance of the ears 88', between which the cartridge-lifter-locker is pivoted. The sear has a rearwardly projecting arm, 38, the extreme rear end of which is shaped to engage the lower end 27 of the firing-pin-arm 26, when said firing-pin-arm is moved forward and during the closing movement of the bolt. The sear is limited in its upward movement by the upper face, 89, of its rearwardly projecting arm 38 striking against the under face, 90, of the abutment 22 of the receiver.

As a means for locking the bolt-actuator against backward movement when the bolt is in its forward locked position, a back-lock or detent-catch, H, is provided, which in the preferred organization thereof, as shown, is carried by the rearward end of the sear as will be hereinafter explained, and is adapted, when the bolt is in its extreme forward locked position, to lie intermediate to, and bear at its forward and rearward ends, against the rear face of the depending actuator-arm and rear end of the sear-arm, respectively, with its point of contact with the actuator-arm between and in substantial horizontal alignment with the point of contact with the sear and its pivotal-point of said sear. In this position of the parts, the back-lock sustains such a relation to the path of movement of the actuator-arm and pivotal-point of the sear, that a retractive force exerted upon the actuator will simply bind the parts mentioned, more securely without altering their relative positions, as will be apparent by reference to Fig. 3 of the drawings. This back-lock H, consists of a web or plate, 140, having a catch, 141, at its forward end to engage the lower rear end of the actuator-arm 33, and having a hub, 142, at its rear end which projects transversely at each side of said web and forms journals, by means of which said back-lock is supported in the sear. As a means for movably securing the said back-lock in the sear, the rearwardly projecting arm 38 of said sear is vertically and longitudinally recessed, as shown at 38', in Fig. 39, and has a downwardly and forwardly projected hook-shaped portion, 90', at its rear end, as clearly shown in said figure, which hook-shaped portion forms a semi-circular bearing to receive and movably support the journals of the back-lock H. The journals of the back-lock will preferably be elongated diametrically as shown in Fig. 39, to form a bearing-face, 143, to bear against the under face of the sear-arm 38, and limit the upward movement of the forward end of said back-lock with relation to the sear. These journals of the detent-catch or back-lock are loosely seated in the bearings, 38'', of the sear with the web 140 thereof projecting through the recess 38' in said sear; the said back-lock is held in position with relation to the sear by means of the sear-spring, 94, which has a bearing at its lower end, 98, in the notch, 97, formed in the inner face of the upper end of the trigger, and bears at its upper end against the under side of said back-lock, as at 144. This sear-spring, as will be seen, has two functions, one to retain the sear-arm 38 normally in an elevated position, with the trigger in its forward position, and to retain the back-lock in operative engagement with the end of the sear-arm 38, and with its forward end in the proper position to engage the actuator-arm 33 when the bolt is in its forward locked position. Formed upon the back-lock at its rear left-hand side, is an upwardly projecting arm, 145, the purpose of which will be hereinafter explained.

One of the chief purposes of this back-lock is to prevent accidental retraction of the bolt-actuator while the firing-pin is in a retracted firing-position with its depending-arm in engagement with the sear, as shown in Fig. 3. This back-lock forms a "dead-lock" against accidental retraction of the bolt-actuator when the parts are in the position shown in Fig. 3, with the bolt in its extreme forward position, and will retain said bolt-actuator in such condition until the back-lock is released from engagement with the actuator-arm 33, either through the medium of the trigger, by depression of the sear-arm, or until said back-lock is depressed and released from engagement with the actuator-arm, independent of the sear, through the medium of the back-lock-actuator K. This back-lock-actuator is journaled in the receiver and is adapted for engagement with the projection 145 of the back-lock to depress the forward end thereof and release it from engagement with the bolt-actuator-arm without affecting the position of the sear, as will be hereinafter more fully described.

The back-lock-actuator consists of a short crank-shaft, 146, which is loosely journaled in a transverse recess, 147, formed through the left-hand wall of the receiver above and slightly in the rear of the cam or projection 145 of the back-lock H. The recess 147 is slightly elongated as shown most clearly in Fig. 12, Sheet 9, and extends to the lower edge of the left-hand wall of the receiver to permit the crank-shaft of the back-lock-actuator to be readily inserted in its bearing from the under side of said receiver. Formed upon, or secured to the inner end of this shaft 146, is a short crank-arm, or cam, 148, which depends below the upper end, and in the path of its movement strikes the cam-projection 145 of the back-lock when the parts are in the position illustrated in Fig. 3; and secured to the outer end of said crank-shaft is a lever, or arm, 149, which is turned upwardly and provided with a thumb-piece, 150 at its forward end. This actuator-lever-arm 149, (preferably constructed of resilient metal) is fitted to closely impinge the outer face of the receiver and has a projection, 151, upon its inner face near its forward end adapted for entering recesses in the outer face of the wall 4 of the receiver to lock the said arm against accidental movement in its operative or inoperative position, as may be desired. This back-lock-actuator, in connection with the back-lock, performs an important function, in that it enables the back-lock H to be thrown out of engagement with the actuator-arm when the parts are in the position shown in Fig. 3, without disturbing the position of the sear with relation to the firing-pin-arm, thus enabling the bolt-actuator to be retracted without firing the cartridge contained in the gun-barrel and permitting said cartridge to be withdrawn as is sometimes desirable.

To disengage the back-lock from the bolt-actuator-arm, without firing the gun, and when the parts are in the position shown in Fig. 3, it is simply necessary to slightly elevate the forward end of the actuating-lever 149 of the crank-shaft which will throw the crank-arm 148 at the inner end thereof against the cam 145 of the back-lock, thereby depressing the forward end of said back-lock, releasing it from engagement with the bolt-actuator-arm and permitting said bolt-actuator to be retracted; the back-lock, during this operation, swings in its bearings in the sear without affecting the position of said sear with relation to the firing-pin-arm.

As a means for ejecting the cartridge, as it is withdrawn from the firing-chamber by the extractor upon the bolt E, during its retraction, an ejector, 69, is provided, which is pivoted at 68' between ears, 69', at the upper end of the guard-block with its forward end, 69², projecting forward and upward. The said ejector has an actuating-arm, 71, at its rear end, which reaches upward into a groove, 72, Fig. 20 formed in the under side of the bolt E, said ejector-arm 71 lying in a vertical plane with relation to the longitudinal axis of the bolt and in the path of movement of the cartridge-shell. Said groove, at its forward end, is shaped as at 73, Fig. 6 to form a cam, which on the retraction of the bolt, strikes and depresses the upwardly projecting arm 71 of the ejector, and thereby throwing the forwardly projecting arm 69, upward as shown in Fig. 6, causing it to strike the under side of the shell and thereby ejecting the shell upward through the mortise 6 of the receiver.

The magazine herein shown, which is designated in a general way by M, consists of a casing comprising the two side-walls, 170, 171, cut away at the center, as shown at 170' and 171', respectively, and the front and rear walls, 172 and 173, respectively, the rear one 173 of which is recessed as shown at 173', to permit the entrance and operation of the cartridge-lifter G. As shown in the drawings, the lower ends of the side-walls of the magazine are inwardly flanged, and one of said flanges is on a lower plane than the other to support the follower or platform, L, (which is of stepped construction) upon which the cartridges rest. This follower is constructed for supporting two corresponding and independent columns of cartridges located side by side within the magazine-case. One of said columns, shown at the right-hand in Fig. 26, rests upon the lower step, 184, of the follower, while the other column shown at the left-hand in said figure, rests upon the upper step, 185, this step being elevated above said lower step by a distance of about one-half of the diameter of the cartridge. In practice, the cartridges are allowed to slightly intermesh as shown in Figs. 3 and 26, for the purpose of properly steadying one column against and by means of the other, but there should be sufficient room widthwise within the magazine-case so that the cartridges of one column shall not directly lift those of the other column. By this arrangement both columns of cartridges may be fed upwardly, by means as hereinafter described, without crowding or jamming therein. The upper edge of the left-hand side-wall of the magazine-case is inwardly flanged at its front and rear ends to form side-lips, 186, and 187, against which the uppermost cartridge of the left-hand column of cartridges bears and is held in position to be engaged by one of the projections 20 at the lower forward end of the sliding-bolt during the forward closing movement of the bolt.

The uppermost cartridge of one of the columns (this being shown at the left-hand in Fig. 26) is held between the rear flange 186 of the magazine-case and uppermost cartridge, 190, of the adjacent column, the flange of the cartridge extending somewhat below the lower left-hand projection 20 at the front end of the bolt E, as designated by dotted lines in Fig. 26. On pushing forward the bolt, this drives said uppermost cartridge forward and the point of the cartridge is lifted and guided by the incline 50, see Fig. 27, upwardly and into the bore of the barrel C, being at the same time carried above the side-lip 187 of the magazine-case, so that when the cartridge has gone forward somewhat less than half its length in the barrel, the head of the cartridge will have been lifted clear of the magazine-case ready to be carried upward into the position ready for firing. After firing this cartridge and ejecting the shell, the uppermost cartridge of the adjoining column of cartridges will be elevated sufficiently to be engaged by the right-hand projection 21 at the lower forward end of the bolt, and at the next forward movement of the bolt E, this cartridge will be similarly driven forward out of the magazine into the gun-barrel. Thus the uppermost cartridges of the columns of cartridges, are alternately acted upon and driven forward by the bolt.

The follower L, upon which the cartridges are supported as before described, is free to have vertical movement within the magazine-case, and is elevated with relation to said case for the purpose of feeding the cartridges into firing-position. As a means for elevating the follower L, to feed the cartridges to the gun-barrel, a swinging cartridge-lifter G, is provided. This cartridge-lifter is keyed to a shaft, 130, journaled at its ends, as before described in the side-walls of the guard-block, and consists of an arm, 132, having its forward end bent upwardly as shown at 133, in Fig. 48, which arm is of sufficient length to project into the magazine-case and engage the follower L at its under side about midway of its length. The extreme outer end of the upwardly projected portion of the arm 132 of the cartridge-lifter is shaped as shown at 134, to correspond to the cross-sectional shape of the follower L, and is of a width approximately equal to the width of said follower. This cartridge-lifter is held normally in yielding contact with the follower by means, preferably, of a volute spring, 139, wound upon and secured at one end to the shaft, and at its opposite end to the guard-block.

Secured to, or formed upon, the outer end of the cartridge-lifter-shaft, and located outside of the guard-block, is a cartridge-lifter-lever, 135, which is so set with relation to the cartridge-lifter-arm 132, that, when said arm is in its highest position, or in the position it assumes when the follower has been relieved of its last cartridge, the said lever will lie in the position shown by dotted lines in Fig. 1, slightly inclined backward from a vertical line and its upper end will engage the lower face of a projection 136, at the upper forward end of the bolt-actuator, thus preventing a retraction of the bolt-actuator until the cartridge-lifter-lever has been moved forward out of engagement with the projection 136 thereon.

Formed upon the rear end of the cartridge-lifter, is a catch or notch, 137, adapted to be engaged, when the cartridge-lifter is in its lowest position, by a catch, 138, formed upon the under side of the cartridge-lifter-locking-arm 68, which locking-arm is pivoted above the shaft of the cartridge-lifter, as hereinbefore described, and loosely rests at its forward end, when the magazine is in place in the receiver, against the rear wall of said magazine, and with its catch out of engagement with the catch upon the cartridge-lifter. This cartridge-lifter-locking-arm 68 is in the nature of a gravity-pawl, it being pivoted at its rear end and having its catch slightly in advance of said pivotal point. This locking arm is automatic in its action. It being keyed to the shaft of the cartridge-lifter, it will, as the cartridge-lifter is forced upward by its spring, as the cartridges in the cartridge-case are discharged, travel upward until it assumes the position shown in dotted lines in Fig. 1, Sheet 1, of the drawings, with its upper end below and in engagement with the projection 136 upon the bolt-actuator; thus locking the same against rotary movement. This position is only assumed by the locking-arm when the cartridge-case is completely emptied of cartridges and the cartridge-lifter is in its extreme elevated position. The locking of the bolt-actuator against retraction by means of the locking-arm as just described, informs the gunner that the magazine or cartridge-case is emptied, after which by pressing the locking-arm forward and downward to the position shown in Fig. 8, Sheet 8, the magazine or cartridge-case is released and allowed to drop out of the receiver, the cartridge-lifter in this position coming into locked engagement with the locking pawl 68, in which condition it is held until another magazine or cartridge-case is inserted. As soon as the upper end of the magazine passes, in dropping out of the receiver, the forward end of the cartridge-lifter-locking-arm, said arm will immediately drop from the position shown in Fig. 3, to a position for engagement with the cartridge-lifter-catch, as shown in Fig. 8, thus automatically locking the cartridge-lifter in a retracted position until another cartridge-magazine is inserted. During the insertion of a cartridge-magazine, the upper end of said magazine will strike the forward end of the locking-arm 68 which protrudes into the path of movement thereof, thus lifting the said locking-arm and automatically releasing its catch from engagement with the catch upon the cartridge-lifter, and the spring 139 will then act to throw the cartridge-lifter forward into engagement with the follower and into operative position to feed the cartridges upward to the gun-barrel.

By this construction and organization of the cartridge-lifter-lever and bolt-actuator, as hereinbefore described, whereby said lever engages and locks the bolt-actuator against retraction, when the cartridge-lifter is in its uppermost position, or in the position it assumes when the cartridge-magazine is empty, a result is obtained greatly advantageous to guns of this class, as by locking the bolt against retraction when the last cartridge is fired, the gunner is made cognizant of the fact that the magazine is emptied of cartridges, enabling him to replace the empty magazine by a filled one and thus obviating the liability of actuating an empty or ineffective gun, as might frequently occur owing to the noise and excitement in active service.

Formed upon the outer face of the guard-block is an indicator, 200, herein shown as consisting of a series of alternate lines and spaces radiating from the axis of the cartridge-lifter-lever, herein shown as ten in number and designated by characters 1, 2, , 4, 5, 6, 7, 8, 9 and 10, respectively, which lines and spaces are so arranged with relation to the different positions assumed by the cartridge-lifter-lever as to designate in connection with said lever (which also acts as a pointer) the number of cartridges contained in the cartridge-magazine.

As a means for locking the cartridge-lifter against upward movement without removing the cartridge-magazine, as is sometimes desirable, a cut-off, or cartridge-lifter-stop, designated in a general way by M' is provided to engage the face, 135', of the cartridge-lifter-lever when it is thrown forward toward the front end of the gun, as shown by dotted lines in Fig. 1, and prevents further upward movement thereof. This cut-off consists of a block, 201, recessed to slide upon a tongue, 202, formed upon the inner face of the right-hand side-wall of the receiver, which receiver is recessed as shown at 203, to receive and permit the sliding movement of said cut-off-block 201. Upon the outer face of said block is a projection, 204, adapted, when the block is in its backward position, for engagement with the upper face of the cartridge-lifter-lever. Formed upon the forward end of said block is an arm, 205, preferably of spring-steel, which tightly bears against the face of the receiver, and has a detent-catch, 206, formed upon its inner face to engage in notches formed in the outer face of said receiver, as shown by dotted lines in Fig. 61, to hold the cut-off M' in its operative or inoperative position with relation to the cartridge-lifter-lever.

When it is desired to prevent upward movement of the cartridge-lifter, and consequently the feeding of cartridges contained in the magazine, it is simply necessary to throw the cartridge-lifter-lever forward below the plane of movement of the cut-off, and slide the cut-off backward into engagement with the upper face thereof, after which the gun may be used as a single-loader, if desired.

The general operation of the fire-arm is as follows:—The gun having been fired and the bolt remaining closed, as shown in Fig. 4, the gunner seizing the handle 93 of the bolt-actuator draws backward thereon to retract the bolt-mechanism to its extreme rearward position, as shown in Fig. 6. The first movement of the actuator F is to turn itself, and by means of its lifting-arm 42, lift the rearward end of the bolt from its position in Fig. 4 to its position in Fig. 5, with the recoil-abutment 24 of the bolt just clear of the recoil-abutment 22 of the receiver. This movement of said actuator carries the actuator-arm 33 backward against the firing-pin-arm 26 and retracts the firing-pin to the position shown in Fig. 5, engaging the catch 27 of said firing-pin-arm over the end of the actuator-arm and thereby locking the actuator firmly in its then position. This position of the bolt-mechanism having been reached, the further drawing back upon the actuator-handle 93 slides the bolt while it stands in its inclined position backward to its retracted position shown engagement with the bore of the barrel as to be readily withdrawn by the direct pull of the bolt.

The element which is designated by 39 and which in the form thereof herein shown, constitutes the sear for operating the firing-pin, and serves, independently of its connection with the firing of the cartridge, as a support of the back-lock hereinbefore described, which back-lock serves as a dead-lock for the bolt-actuator-arm when the parts are in the position illustrated in Fig. 3, the said sear retaining said back-lock in locked engagement with the said bolt-actuator-arm while the bolt is in its extreme forward locked position, as hereinbefore more fully described.

By the term "sliding-bolt" as used herein, is meant the longitudinally reciprocating bolt arranged rearwardly of the gun-barrel for opening and closing the same, said bolt being drawn back by a longitudinal movement thereof for opening the barrel and extracting the cartridge, and carried forward by the reverse longitudinal movement thereof to drive the cartridge forward into the gun-barrel and close the bore thereof.

The detent-catch 7 for holding the bolt-mechanism in the gun, also serves as a guide for controlling the sliding movement of the bolt. As in the application Serial No. 443,481, hereinbefore referred to, the forward side of said detent-catch is inclined to form a cam-face for engaging the forward end-cam-face of the sliding detent-pin 12 for the purpose of guiding this pin from the position shown in Fig. 24, to that shown in Fig. 23, when, after releasing the detent-pin by drawing back the slide 13, the operator draws the bolt-mechanism backward to remove the same from the gun. When it is required to remove the detent-holding slide 13, the operator has only to lift the spring 15 so that its catch 16 will be disengaged from the bolt-catch 17 and thus allow the slide 13 to be slid forward in the groove in the bolt and removed therefrom.

The lever 42 of the oscillating bolt-actuator F acts in the nature of a cam, especially during the backward movement thereof for opening the bolt. The extent to which the lever or arm referred to conforms to the usual operation of a lever or cam, will, of course, depend upon the particular form and proportions of said parts, and those proportions may be varied within considerable limits without materially modifying the action of this element of the complete bolt-mechanism.

By the term "transverse movement" as applied to the bolt of the gun, is meant that motion which, according to this present invention, said bolt has in a direction crosswise to the line of its longitudinal reciprocating movement, this latter movement being substantially in alignment with the bore of the gun.

The recoil-abutment 22 of the receiver being formed inclined substantially as shown, the bolt E when this is closed transversely from the position shown in Fig. 7 to that shown in Fig. 3, is forced slightly forward with great power for the purpose of driving the cartridge firmly into place in the bore of the gun. Said transverse closing movement of the bolt being effected by suitable mechanical appliances operating substantially as herein set forth, is readily accomplished by a slight forward pressure on the handle 93 of the bolt-actuator.

By supporting the bolt-locker or bolt-actuator upon the bolt in the manner set forth, and extending the handle-arm thereof downwardly by the side of the stock of the gun, the handle is brought into a position which enables the gunner to operate the bolt-mechanism without taking the gun from his shoulder, thus reducing by two the number of "movements" which would otherwise be required for operating the fire-arm.

By means of this present invention an important object is accomplished in simplifying the management of the gun, the entire operation of the breech-loading mechanism being effected by continuous strokes of the handle 93 forwardly and backwardly alongside the gun-stock.

One of the results attained by the moving forward of the bolt while this is in the inclined position described, is that the forward end of the bolt bears against the head of the cartridge only on the rim thereof, until after the cartridge has been so far forced home and the bolt has been moved transversely so far behind the recoil-abutment as to make it safe to explode the cartridge. By this means, the danger inherent in some breech-loading guns is overcome, which danger arises, usually, from the protrusion of the cap beyond the plane of the cartridge-head; this defect in ammunition, as is well-known, is frequently met with. According to the present system of handling the cartridge whereby the pressure is applied only to the rim of the cartridge-head, until this is safely placed in its firing-position, the accidental firing of the cartridge by the impingement of the bolt, during the closing thereof upon a protruding cap, is obviated.

The improved magazine or cartridge packet, and the ammunition-piece comprising such packet, which are herein shown and described, are not claimed herein but constitute the subject-matter of a separate application, Serial No. 492,860, filed December 5, 1893.

Having thus described my invention, I claim—

1. In a bolt-gun, a receiver carrying a sliding bolt substantially as described, in combination with a bolt-actuator carried by the bolt and having an actuator-arm adapted for engagement with a projection upon the receiver when the bolt is in its forward closed position to lock the bolt against transverse movement with relation to the receiver, a firing-pin having a depending arm, a sear adapted for engagement with said firing-pin-arm for holdin Fig. 6. The first described lifting movement of the bolt acts, as hereinbefore set forth, after the manner of a powerful lever to forcibly withdraw the cartridge a short distance but with great force from the gun-chamber 106; the cartridge-shell having been thus started from its seat is thereafter readily drawn back, so that this may readily be done by a direct pull upon the handle 93 of the bolt-mechanism. Just previous to reaching its fully retracted position, the ejector-cam 73 on the under side of the bolt strikes the arm 71 of the ejector and forcibly throws this downward, and the ejector-arm 69 being thereby thrown upward ejects the shell upward through the mortise 6 of the receiver as hereinbefore more fully set forth, and as illustrated in connection with Fig. 6. The shell having been ejected and another cartridge brought up from the magazine to the position shown in Fig. 6, forward of the bolt, the operator then pushes forward the bolt by a steady pressure upon the actuator-lever-handle 93. The first forward movement of the bolt drives the cartridge forward with its point against the guide-way 191 which lifts it upward to the gun-chamber so that during the remaining forward movement of the bolt the cartridge is slid into place in said chamber. The bolt having gone forward to the position shown in Fig. 7, the lower end of the firing-pin-arm 26 engages the sear and is thereby held retracted during the remaining forward movement of the bolt-mechanism; at the same time the forwardly extending actuator-arm 42 reaches under the guide-arm 43 of the receiver, thereby preventing any forwardly rotating movement of the bolt-actuator relatively to the bolt until the bolt shall have gone downward and forward to bring its recoil-abutment 24 forward of the receiver recoil-abutment 22; at the same time the guide-face 41 of the bolt-actuator by riding on the guide-face 40 of the receiver prevents the pressure upon the actuator (after the unhooking of the actuator-arm 43 from the firing-pin-arm 26) from turning the actuator and thus prematurely tending to lower the bolt which would cramp the parts and prevent their free action. This construction and organization of the parts insures the releasing of the actuator-arm from the firing-pin-catch prior to the beginning of the forward rotary movement of the actuator. The bolt-mechanism having been drawn forward, as set forth, to the position shown in Fig. 7, with the actuator abutment-face 44 forward of the corresponding receiver abutment-face 45, the continued pressure upon the actuator-handle now turns or shifts said actuator from the position shown in Fig. 7 to that shown in Fig. 3, thereby carrying down the bolt (by means of the lever-arm 42 and the safety cam 37 hereinbefore described) which draws down the actuator and bolt together, and locks the same in their closed position; at the same time the back-lock-actuator-catch H, is thrown upward by the sear-spring with its forward end into locked engagement with the rear side of the depending actuator-arm, 70 thus securing a "dead-lock" to prevent accidental retraction of the bolt-actuator until after the gun has been fired, or until the back-lock-actuator-catch has been depressed by means of the back-lock-actuator K, as hereinbefore described. The gun now being loaded and locked ready for firing, the gunner has only to take aim, and when ready to fire, pull the trigger; this through the connections described, retracts the sear from its engagement with the firing-pin which is then thrown forward by the firing-spring 32 to strike with its point 107 the cap of the cartridge and thus fire the same, this action simultaneously releasing the back-lock from locked engagement with the bolt-actuator-arm. The gun having been fired, is then ready for the repetition of the loading operation which is again performed as hereinbefore described.

That element of the bolt-mechanism which is designated as the "firing-pin" not only constitutes a pin for firing the cartridge, but the rearward portion thereof also serves as a spring-actuated bolt-actuator-locker. Considering said element only as an actuator-locker operating for the purpose specified, it consists, in the preferred form thereof herein shown, of the rod 25 provided with an arm 26 and having a hook or catch 27 engaging the depending-arm of the actuator for locking the same in its retracted position; the object of this arrangement being to temporarily and securely lock the actuator against any shifting movement relatively to the bolt during the operation of withdrawing and sliding forward the bolt-mechanism. By this means the handle of the shiftable actuator F is made to serve as a handle for operating the bolt as set forth, and operates both parts by a continuous single stroke; also the actuator is thereby prevented from having any premature rotary movement relatively to the bolt.

In view of its function of serving as a lever for starting the cartridge, the sliding-bolt in some of the claims is designated as a "lever-bolt," it serving as a lever for the purpose specified. The projection or arm 108 hereinbefore fully described constitutes the fulcrum which bears against the fulcrum-seat or bearing at 109 for drawing back the cartridge-supporting face of the bolt and the extractor-hook adjacent thereto during the transverse movement of the rearward end of the lever-bolt. The length of the aforesaid fulcrum-arm 108—i. e., the distance between the extractor and the effective fulcrum 108—is comparatively short relatively to the length of the bolt, and may be regulated in practice to correspond to the length of the bolt and the extent of the transverse movement of the rearward end thereof in connection with the distance to which it may be required to draw the cartridge-shell before this becomes so freed from ing said firing-pin retracted, and an independently operable back-lock interposed between the sear and actuator-arm and adapted for engagement with said actuator-arm when the bolt-mechanism is in its firing-position to prevent accidental retraction thereof, substantially as described.

2. In a gun, a receiver carrying a sliding bolt, substantially as described, in combination with a bolt-actuator having a locking-arm, a sear, and an independently operable back-lock interposed between the sear and locking-arm of the actuator and adapted for engagement with said locking-arm when the bolt is in its forward closed position to prevent accidental retraction thereof, substantially as and for the purpose described.

3. In a bolt-gun, a receiver carrying a reciprocatory bolt, an oscillating bolt-locker (and a firing-pin retracting sear), in combination with an independently operable back-lock carried by the sear in the rear of and adapted for engagement with and disengagement from the bolt-locker, and means for actuating said back-lock, substantially as and for the purpose described.

4. In a bolt-gun, a receiver adapted for carrying a sliding bolt, a sliding bolt carried by said receiver and a firing-pin having a firing-pin-arm substantially as described, carried by said bolt, in combination with bolt-actuating-and-locking mechanism comprising a bolt-actuator carried by the bolt and having a locking-arm, a spring-actuated sear adapted for engagement with said firing-pin-arm for holding the same retracted, and an independently operable back-lock carried by the sear in the rear of the locking-arm of the bolt-actuator and adapted for engagement with said locking-arm when the bolt is in its firing-position to lock the said bolt-actuator against accidental retraction, substantially as described.

5. In a bolt-gun, the combination with the receiver adapted for carrying a sliding bolt, of a bolt sliding in said receiver, a firing-pin having a firing-pin-arm carried by said bolt, a sear arranged to engage the firing-pin-arm to hold the same in a retracted position, and back-locking mechanism adapted for preventing accidental retraction of the bolt-actuator consisting of an independently operable back-lock pivotally supported by the sear in position for engagement with the locking-arm of the actuator, substantially as described, and an independent back-lock-actuator constructed for engagement with the back-lock to throw the same out of engagement with the locking-arm of the actuator, substantially as and for the purpose herein set forth.

6. The herein described organization in a bolt-gun, of co-acting mechanism consisting, essentially, of a receiver adapted for carrying a sliding bolt and having a recoil abutment, a bolt fitted to slide in said receiver and capable of transverse movement from and into engagement with said recoil abutment, a bolt-actuator carried by the bolt and constructed to engage the receiver when the bolt is in its forward position and to disengage itself from the receiver on the retractive sliding movement of the bolt and having a depending locking-arm, the firing-pin carried in the bolt and having a firing-pin-arm, a spring-actuated sear adapted for engagement with the firing-pin-arm to hold the firing-pin in a retracted position, an independently operable back-lock intermediate to said sear and locking-arm of the actuator and adapted for engagement with and prevent retraction of said locking-arm, and means substantially as described for independently actuating the back-lock to disengage it from the locking-arm, and a trigger to actuate the sear, substantially as set forth.

7. In a bolt-gun, a receiver carrying a reciprocatory bolt and an oscillating bolt-locker, in combination with a spring-actuated sear and back-locking mechanism consisting of a back-lock pivotally supported by the sear in position to engage the bolt-locker and lock the same against retraction, and a back-lock-actuator consisting of a crank-shaft having means, substantially as described, for engaging said back-lock and throwing the same into an inoperative position with relation to the bolt-locker and having an operating lever connecting therewith, all substantially in a manner and for the purpose set forth.

8. In a bolt-gun, the combination with the receiver carrying a sliding bolt, and a cartridge case, of cartridge-lifting-and-locking mechanism, comprising, essentially, a cartridge-supporting follower loosely contained within the cartridge-case, a spring-actuated cartridge-lifter pivoted in the rear of the cartridge-case between the walls of the receiver and having an arm projecting within said receiver and engaging the follower, and means substantially as described, for locking said cartridge-lifter in a retracted or inoperative position, all coacting substantially as and for the purpose set forth.

9. In a bolt-gun, a receiver carrying a sliding bolt and a bolt-actuator, a magazine supported in said receiver in combination with a spring-actuated cartridge-lifter having an actuating-lever constructed for engagement, when the cartridge-lifter is in its uppermost position, with the bolt-actuator to prevent retraction thereof, substantially in the manner and for the purpose described.

10. In a bolt-gun, the combination with the receiver carrying a sliding bolt, a bolt-locking actuator and a cartridge-case supported in said receiver, and a cartridge-lifting and actuator locking mechanism comprising, essentially, a cartridge-supporting follower, a spring-actuated cartridge-lifter pivoted in the rear of the cartridge-case between the walls of the receiver and having an arm adapted for engagement with the follower to lift the same, a cartridge-lifter actuating-lever connected with said cartridge-lifter and constructed for engagement with the bolt-actuator when the cartridge-lifter and follower are in their most elevated position, to lock the actuator against retraction, substantially as described, and a cartridge-lifter-locker constructed for automatically engaging and locking the cartridge-lifter in a retracted or depressed condition when the cartridge-case is withdrawn from the receiver, and for automatically releasing the cartridge-lifter when the cartridge-case is inserted in said receiver, substantially as and for the purpose set forth.

11. In a bolt-gun, in combination, a vertically and longitudinally recessed receiver adapted for carrying a sliding bolt and for supporting a cartridge-case, a sliding bolt and bolt-actuator carried by said receiver, a removable cartridge-case, a spring-actuated cartridge-lifter pivoted in the rear of said cartridge-case between the walls of the receiver and having an arm extended into said cartridge-case, an indicator-plate and a combined indicator-arm, cartridge-lifter-actuator, and bolt-actuator-locker connected with the pivot or shaft of the cartridge-lifter and so disposed with relation to the indicator-plate, cartridge-lifter and bolt-actuator as to be moved by said cartridge-lifter, automatically indicate the number of cartridges contained in the cartridge-case, and, when the case is empty or the cartridge-lifter is in its extreme upper position, engage and lock the bolt-actuator, substantially as described.

12. The combination in a bolt-gun, of a receiver carrying a sliding bolt and constructed to receive a cartridge-magazine, a cartridge-magazine comprising a packet or cartridge-case open at its upper and lower ends and having its rear wall recessed as described, a cartridge supporting follower loosely contained in said case, a spring-actuated cartridge-lifter pivotally supported at one end between the walls of the receiver and having its free end extended through the recess in the rear wall of the cartridge-case and engaging the follower to lift the same, a cartridge-lifter-actuator secured to the pivotal-point or shaft of the cartridge-lifter and operable from the outside of the receiver, and a cartridge-lifter-locker pivoted at one end above and in position to engage and lock the cartridge-lifter when in its retracted or depressed position and adapted to be thrown out of locked-engagement with the cartridge lifter by the insertion of the cartridge-case within the receiver, substantially as and for the purpose described.

13. In a bolt-gun, a receiver constructed substantially as described for carrying a sliding bolt and having a recoil abutment, a locker-abutment and a hook-engaging catch, and a bolt fitted to slide in the receiver and capable of transverse movements with relation thereto for engagement with and disengagement from the receiver recoil abutment, in combination with a firing-pin carried by said bolt and having a depending arm, a bolt-locker carried by the bolt and adapted for engagement with the locker-abutment of the receiver when the bolt is closed and having a hook or locking-arm to engage said receiver-hook catch when the bolt is in a closed position whereby the bolt is simultaneously double-locked against retraction and held against transverse opening-movement, a pivoted spring-actuated sear adapted for engagement with the firing-pin-arm to hold the same in a retracted position, an independently operable back-lock pivotally supported by said sear and interposed between said sear and actuator-hook and constructed for engagement with said hook or actuator-arm to prevent accidental retraction thereof when the bolt is in its firing position, and means, substantially as described, for independently operating said back-lock to disengage it from the hook or actuator-arm, substantially as and for the purpose set forth.

JAMES P. LEE.

Witnesses:
 FRANCIS H. RICHARDS,
 JOHN L. EDWARDS, Jr.